(12) United States Patent
Zhang et al.

(10) Patent No.: US 11,695,945 B2
(45) Date of Patent: Jul. 4, 2023

(54) TWO-LEVEL SIGNALING OF FILTERING INFORMATION IN VIDEO PROCESSING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/494,305

(22) Filed: Oct. 5, 2021

(65) Prior Publication Data

US 2022/0038705 A1    Feb. 3, 2022

Related U.S. Application Data

(63) Continuation of application No. 17/357,020, filed on Jun. 24, 2021, now Pat. No. 11,206,406, which is a
(Continued)

(30) Foreign Application Priority Data

Mar. 4, 2019  (WO) ................ PCT/CN2019/076852
Mar. 11, 2019  (WO) ................ PCT/CN2019/077643
Mar. 17, 2019  (WO) ................ PCT/CN2019/078410

(51) Int. Cl.
*H04N 19/46*    (2014.01)
*H04N 19/176*   (2014.01)
(Continued)

(52) U.S. Cl.
CPC ........... *H04N 19/46* (2014.11); *H04N 19/132* (2014.11); *H04N 19/176* (2014.11);
(Continued)

(58) Field of Classification Search
CPC .... H04N 19/46; H04N 19/132; H04N 19/176; H04N 19/184; H04N 19/186; H04N 19/30; H04N 19/31; H04N 19/70; H04N 19/82
See application file for complete search history.

(56) References Cited

U.S. PATENT DOCUMENTS 10,771,813 B2    9/2020  Lin et al.
2013/0022104 A1*  1/2013  Chen ...................... H04N 19/46
                                                    375/E7.027
(Continued)

FOREIGN PATENT DOCUMENTS

CN    106060567 A    10/2016
CN    108366265 A    8/2018
(Continued)

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
(Continued)

*Primary Examiner* — Jae N Noh
(74) *Attorney, Agent, or Firm* — Perkins Coie LLP

(57) ABSTRACT

A video processing method is provided to include performing a conversion between a coded representation of a video comprising one or more video regions and the video, wherein the coded representation includes a first side information at a first level, and wherein a second side information at a second level is derived from the first side information
(Continued)

Flowchart of decoding flow with reshaping.

such that the second side information provides parameters for a video unit coded with in-loop reshaping (ILR) in which a reconstruction of the video unit of a video region is based on a representation of a video unit in a first domain and a second domain and/or scaling chroma residue of a chroma video unit.

20 Claims, 31 Drawing Sheets

Related U.S. Application Data continuation of application No. PCT/CN2020/077723, filed on Mar. 4, 2020.

(51) Int. Cl.
| | | |
|---|---|---|
| H04N 19/30 | (2014.01) | |
| H04N 19/132 | (2014.01) | |
| H04N 19/70 | (2014.01) | |
| H04N 19/186 | (2014.01) | |
| H04N 19/184 | (2014.01) | |
| H04N 19/31 | (2014.01) | |
| H04N 19/82 | (2014.01) | |

(52) U.S. Cl.
CPC ......... *H04N 19/184* (2014.11); *H04N 19/186* (2014.11); *H04N 19/30* (2014.11); *H04N 19/31* (2014.11); *H04N 19/70* (2014.11); *H04N 19/82* (2014.11)

(56) References Cited

U.S. PATENT DOCUMENTS

| | | | | |
|---|---|---|---|---|
| 2013/0114743 | A1* | 5/2013 | Sjoberg | H04N 19/70 375/240.26 |
| 2014/0307772 | A1 | 10/2014 | Hishinuma | |
| 2015/0131747 | A1 | 5/2015 | Han et al. | |
| 2017/0085879 | A1 | 3/2017 | Minoo et al. | |
| 2017/0163982 | A1 | 6/2017 | Fu et al. | |
| 2019/0014348 | A1 | 1/2019 | Ye et al. | |
| 2019/0320191 | A1 | 10/2019 | Song et al. | |
| 2019/0349607 | A1 | 11/2019 | Kadu et al. | |
| 2020/0267392 | A1 | 8/2020 | Lu et al. | |
| 2020/0288173 | A1 | 9/2020 | Ye et al. | |
| 2021/0029361 | A1 | 1/2021 | Lu et al. | |
| 2022/0060709 | A1* | 2/2022 | Zhao | H04N 19/82 |

FOREIGN PATENT DOCUMENTS

| | | |
|---|---|---|
| CN | 109076247 A | 12/2018 |
| WO | 2012122425 A1 | 9/2012 |
| WO | 2016164235 A1 | 10/2016 |
| WO | 2016172361 A1 | 10/2016 |
| WO | 2019006300 A1 | 1/2019 |

OTHER PUBLICATIONS

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.
Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001,2019.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al. "CE4: Separate List for Sub-Block Merge Candidates (Test 4.2.8)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0369, 2018.
Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.
Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.
Francois et al. "CE12-Related: Block-Based In-Loop Luma Reshaping," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M0109, 2019.
Han et al. "CE4.1 3: Affine Motion Compensation Prediction," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0337, 2018.
"Information Technology—High Efficiency Coding and Media Delivery in Heterogeneous Environments—Part 2: High Efficiency Video Coding" Apr. 20, 2018, ISO/DIS 23008, 4th Edition.
Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.
Lee et al. "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting, Macau, CN, Oct. 8-12, 2012, document JVET-L0142, 2018.
Lu et al. "CE12: Mapping Functions (Test CE12-1 and CE12-2)," Joint Video Experts Team (JVET) of ITU-t SG 16 WP 3 and ISO/IEC JTC 1/SC 29/WG 11, 13th Meeting, Marrakech, MA, Jan. 9-18, 2019, document JVET-M0427, 2019.
Pu et al. "CE12-4: SDR In-Loop Reshaping," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0246, 2018.
Rasch et al. "CE10: Uniform Directional Diffusion Filters for Video Coding," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0157, 2018.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.
Rusanovskyy et al. "CE14: Test on In-Loop Bilateral Filter From JVET-J0021/JVET-K0384 with Parametrization (CE14.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0406,2018.
Sethuraman, Sriram. "CE9: Results of DMVR Related Tests CE9.2.1 and CE9.2.2," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0147, 2019.
Stepin et al. "CE2 Related: Hadamard Transform Domain Filter," Joint Video Expters Team (JVET) of ITU-T SG 16 and ISO/IEC JTC 1/SC 29/WG 11, 11th Meeting, Ljubljana, SI, Jul. 10-18, 2018, document JVET-K0068, 2018.
Wang et al. "AHG17: On Header Parameter Set (HPS)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0132, 2019.
JEM-7.0: https://jvet.hhi.fraunhofer.de/svn/svn_HMJEMSoftware/tags/HM-16.6-JEM-7.0.
https://vcgit.hhi.fraunhofer.de/jvet/VVCSoftware_VTM/tags/VTM-2.1.
International Search Report and Written Opinion from International Patent Application No. PCT/CN2020/077723 dated May 28, 2020 (9 pages).

(56) References Cited

OTHER PUBLICATIONS

International Search Report and Written Opinion from International Patent Application No. PCT/CN2020/077724 dated May 29, 2020 (9 pages).
International Search Report and Written Opinion from International Patent Application No. PCT/CN2020/077725 dated May 29, 2020 (9 pages).
Notice of Allowance from U.S. Appl. No. 17/357,311 dated Sep. 7, 2021.
Notice of Allowance from U.S. Appl. No. 17/357,020 dated Aug. 20, 2021.

* cited by examiner

Derivation process for merge candidates list construction

Positions of spatial merge candidates

Candidate positions for temporal merge candidate, C0 and C1

Illustration of motion vector scaling for spatial motion vector candidate

ATMVP motion prediction for a CU

Example of one CU with four sub-blocks (A-D) and its neighbouring blocks (a–d)

6 parameter affine 4 parameter affine 6-parameter affine model 4-parameter affine model Flowchart of decoding flow with reshaping.

Neighboring samples utilized in bilateral filter.

Scan pattern. A – current pixel, BCD – surrounding pixels

TWO-LEVEL SIGNALING OF FILTERING INFORMATION IN VIDEO PROCESSING

CROSS REFERENCE TO RELATED APPLICATIONS

This application is a continuation of U.S. application Ser. No. 17/357,020, filed on Jun. 24, 2021, which is a continuation of International Application No. PCT/CN2020/077723 filed on Mar. 4, 2020, which claims the priority to and benefit of International Patent Application No. PCT/CN2019/076852, filed on Mar. 4, 2019, International Patent Application No. PCT/CN2019/077643, filed on Mar. 11, 2019, and International Patent Application No. PCT/CN2019/078410, filed on Mar. 17, 2019. All the aforementioned patent applications are hereby incorporated by reference in their entireties.

TECHNICAL FIELD

This patent document relates to video processing techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video processing tools and tests are currently underway for determining their effectivity.

SUMMARY

Devices, systems and methods related to digital video processing, for example, block-based in-loop reshaping with other tools in video processing. It may be applied to the existing video coding standard like HEVC, or the standard (Versatile Video Coding) to be finalized. It may be also applicable to future video coding standards or video codec.

In one representative aspect, the disclosed technology may be used to provide a method for video processing. This method includes performing a conversion between a coded representation of a video comprising one or more video regions and the video, wherein the coded representation includes side information applicable for in-loop reshaping (ILR) of some of the one or more video regions, wherein the side information provides parameters for a reconstruction of a video unit of a video region based on a representation of the video unit in a first domain and a second domain and/or scaling chroma residue of a chroma video unit, and wherein the side information applicable to the some of the one or more video regions is coded without directly inheriting from other video regions.

In another representative aspect, the disclosed technology may be used to provide another method for video processing. This method includes performing a conversion between a coded representation of a video comprising one or more video regions and the video, wherein the coded representation includes side information applicable for in-loop reshaping (ILR) of some of the one or more video regions, wherein the side information provides parameters for a reconstruction of a video unit of a video region based on a representation of the video unit in a first domain and a second domain and/or scaling chroma residue of a chroma video unit, and wherein the coded representation includes the side information at a video region level that includes a current video block.

In another representative aspect, the disclosed technology may be used to provide another method for video processing. This method includes determining a prediction block of a current video block, for a conversion between the current video block of a video region of a video and a coded representation of the video, using samples from the video region, wherein unavailable samples of the samples from the video region are determined based on a derivation rule that specifies to use an in-loop reshaping (ILR) information associated with the current video block; and performing the conversion based on the prediction block, wherein the in-loop reshaping information includes information for a reconstruction of a video unit of the video region based on a representation of the video unit in a first domain and a second domain and/or scaling chroma residue of a chroma video unit.

In another representative aspect, the disclosed technology may be used to provide another method for video processing. This method includes performing a conversion between a current video block of a video and a coded representation of the video using an in loop reshaping process, wherein the in loop reshaping process includes: obtaining a prediction block from motion compensation prediction or an intra prediction; applying a forward reshaping to the prediction block to generate a forward reshaped prediction block in a first domain; reconstructing, based on the forward reshaped prediction block, the coded representation of the video to generate a first reconstruction block in a second domain; applying an inverse reshaping to the first reconstruction block to obtain an inverse reconstruction block; applying a loop filter to the inverse reconstruction block to obtain a final reconstruction block, and wherein a single clipping process is used during the in loop reshaping process.

In another representative aspect, the disclosed technology may be used to provide another method for video processing. This method includes performing a conversion between a coded representation of a video comprising one or more video regions and the video, wherein the coded representation includes in-loop reshaping (ILR) information applicable for a reconstruction of a video unit of a video region based on a representation of the video unit in a first domain and a second domain and/or scaling chroma residue of a chroma video unit, and wherein a clipping process is used for the conversion based on clipping parameters that are in the first domain and/or in the second domain according to the ILR information.

In another representative aspect, the disclosed technology may be used to provide another method for video processing. This method includes performing a conversion between a coded representation of a video comprising one or more video regions and the video, wherein the coded representation includes information applicable for in-loop reshaping (ILR) of some of the one or more video regions, wherein the information provides ILR parameters for a reconstruction of a video unit of a video region based on a representation of the video unit in a first domain and a second domain and/or scaling chroma residue of a chroma video unit, and wherein the ILR parameters include clipping parameters used according to a rule for a clipping process during the rule.

In another representative aspect, the disclosed technology may be used to provide another method for video processing. This method includes determining whether an in loop reshaping (ILR) is enabled for a conversion between a coded representation of a video comprising one or more video regions and the video; and performing the conversion based on the determining, wherein a clipping process is used for the conversion based on ILR clipping parameters derived according to information associated with the ILR and/or fixed clipping parameters unrelated to the information associated with the ILR, and wherein the information associated with the ILR is applicable for a reconstruction of a video unit of a video region based on a representation of the video unit in a first domain and a second domain and/or scaling chroma residue of a chroma video unit.

In another representative aspect, the disclosed technology may be used to provide another method for video processing. This method includes performing a conversion between a current video block of a video that is a chroma block and a coded representation of the video, wherein the coded representation includes side information applicable for in-loop reshaping (ILR) of some of the one or more video regions, wherein the side information provides parameters for a reconstruction of a video unit of a video region based on a representation of the video unit in a first domain and a second domain and/or scaling chroma residue of a chroma video unit, and wherein the conversion further includes applying a reshaping process to one or more chroma components of the current video block based on the side information.

In another representative aspect, the disclosed technology may be used to provide another method for video processing. This method includes performing a conversion between a coded representation of a video comprising one or more video regions and the video, wherein the coded representation includes side information applicable for in-loop reshaping (ILR) of some of the one or more video regions, wherein the side information provides parameters for a reconstruction of a video unit of a video region based on a representation of the video unit in a first domain and a second domain and/or scaling chroma residue of a chroma video unit, and wherein the side information for a current video region is determined according to a rule that disallows inheritance or prediction of the side information based on a temporal layer index of the current video region.

In another representative aspect, the disclosed technology may be used to provide another method for video processing. This method includes performing a conversion between a coded representation of a video comprising one or more video regions and the video, wherein the coded representation includes side information applicable for in-loop reshaping (ILR) of some of the one or more video regions, wherein the side information provides parameters for a reconstruction of a video unit of a video region based on a representation of the video unit in a first domain and a second domain and/or scaling chroma residue of a chroma video unit, and wherein the side information for a current video region is determined according to a rule that disallows inheritance or prediction of the side information from a first type of another picture.

In another representative aspect, the disclosed technology may be used to provide another method for video processing. This method includes performing a conversion between a coded representation of a video comprising one or more video regions and the video, wherein the coded representation includes a first side information at a first level, wherein a second side information at a second level is derived from the first side information such that the second side information provides parameters for a video unit coded with in-loop reshaping (ILR) in which a reconstruction of the video unit of a video region is based on a representation of a video unit in a first domain and a second domain and/or scaling chroma residue of a chroma video unit.

One or more of the above-disclosed methods can be an encoder-side implementation or a decoder-side implementation.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

DETAILED DESCRIPTION

1. Video Coding in HEVC/H.265

Figure 1:
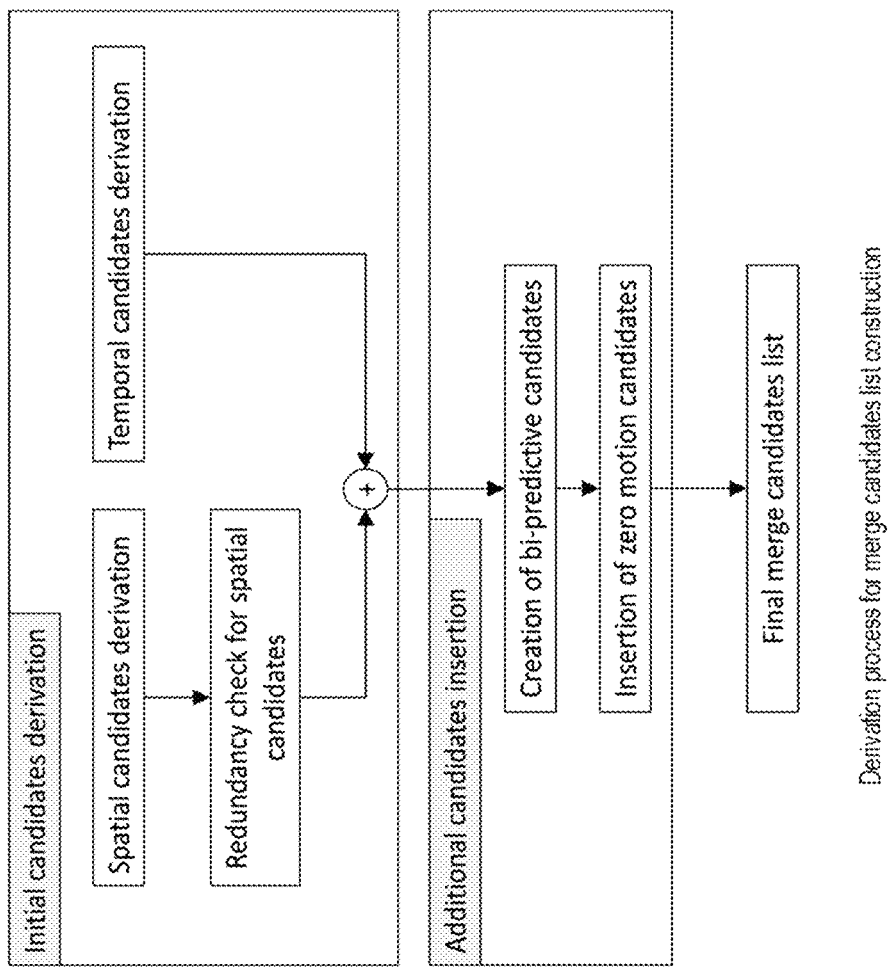
FIG. 1 shows an example of constructing a merge candidate list.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC. The latest version of VVC draft, i.e., Versatile Video Coding (Draft 2) could be found at http://phenix.it-sudparis.eu/j_vet/doc_end_user/documents/11_Ljubljana/wg11/JVET-K1001-v7.zip The latest reference software of VVC, named VTM, could be found at: https://vcgit.hhi.fraunhofer.de/jvet/VVCSoftware_VTM/tags/VTM-2.1

2.1. Inter Prediction in HEVC/H.265

Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as "uni-prediction." Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1. Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2. Merge Mode

2.1.2.1. Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2. Spatial Candidates Derivation

Figure 2:
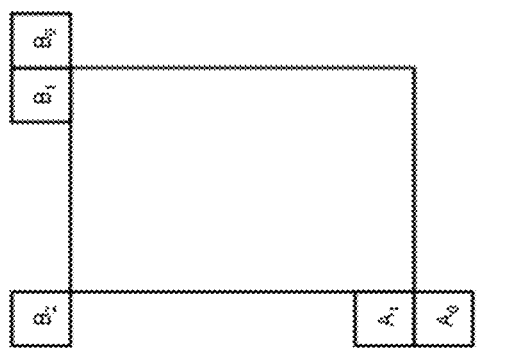
FIG. 2 shows an example of positions of spatial candidates.
Figure 3:
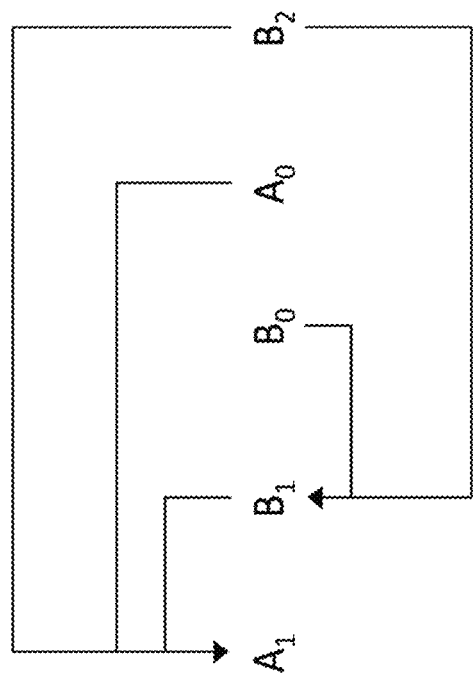
FIG. 3 shows an example of candidate pairs subject to a redundancy check of spatial merge candidates.
Figures 4A, 4B:
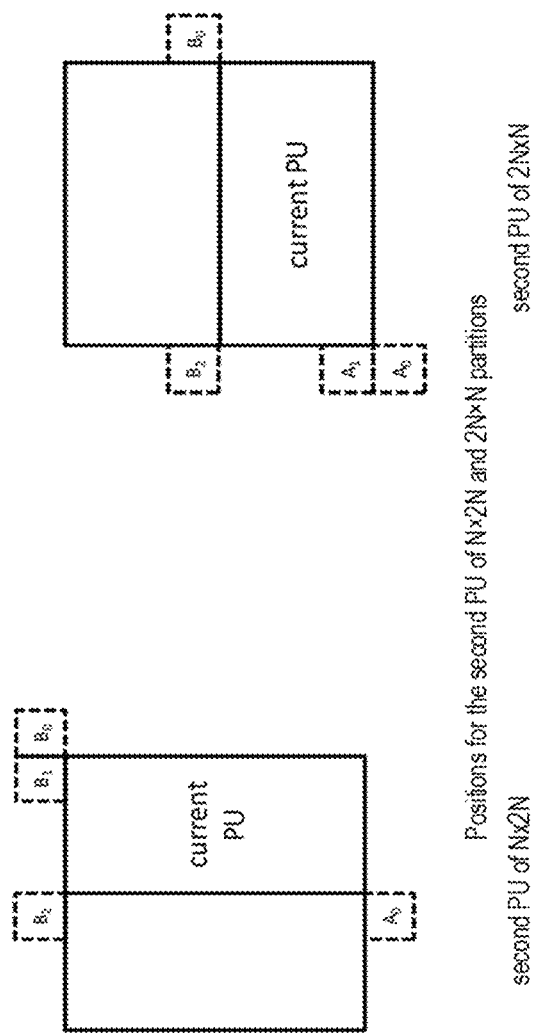
FIGS. 4A and 4B show examples of the position of a second prediction unit (PU) based on the size and shape of the current block.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3. Temporal Candidates Derivation

Figure 5:
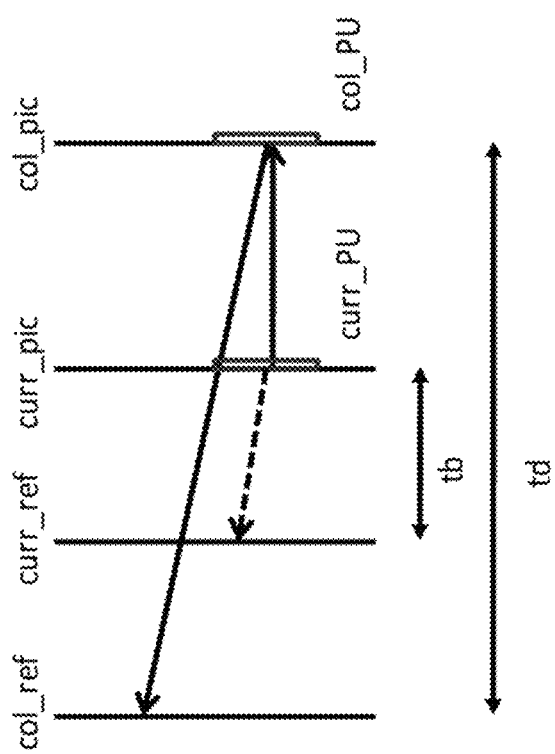
FIG. 5 shows an example of motion vector scaling for temporal merge candidates.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
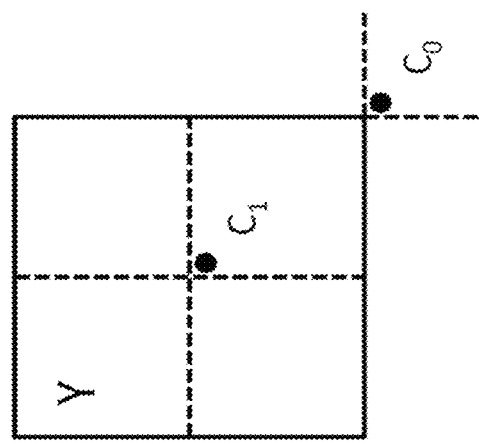
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU a/k/a LCU, largest coding unit) row, position $C_1$ is used. Otherwise, position $C_0$ is used in the derivation of the temporal merge candidate.

2.1.2.4. Additional Candidates Insertion

Figure 7:
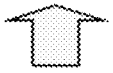
FIG. 7 shows an example of generating a combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3. AMVP

AMVP exploits spatio-temporal correlation of motion vector with neighboring PUs, which is used for explicit transmission of motion parameters. For each reference picture list, a motion vector candidate list is constructed by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly, with merge index signaling, the index of the best motion vector candidate is encoded using truncated unary. The maximum value to be encoded in this case is 2 (see FIG. 8). In the following sections, details about derivation process of motion vector prediction candidate are provided.

2.1.3.1. Derivation of AMVP Candidates

Figure 8:
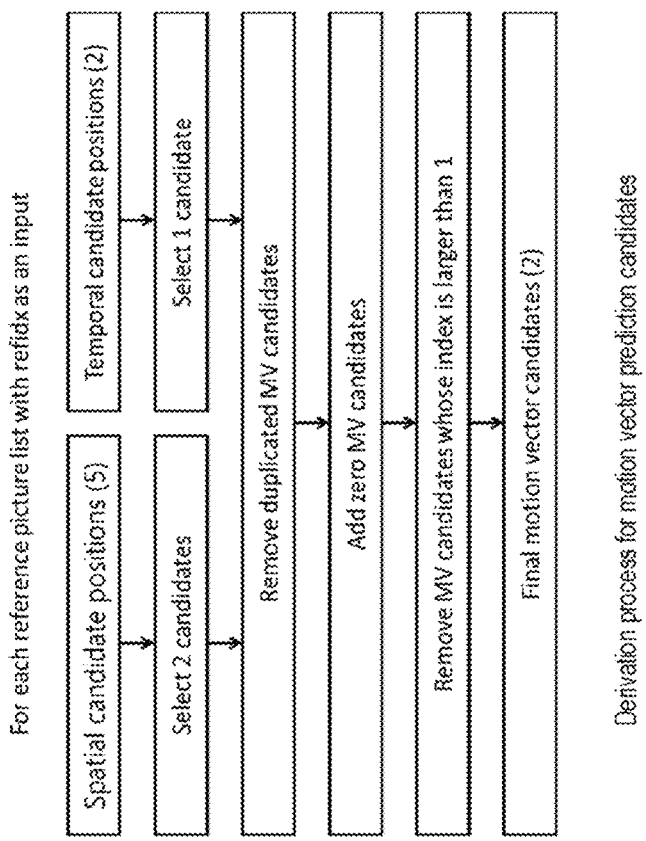
FIG. 8 shows an example of constructing motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2. Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not where spatial scaling is not used, and two cases where spatial scaling is used. The four different cases are summarized as follows.

No spatial scaling
   (1) Same reference picture list, and same reference picture index (same POC)
   (2) Different reference picture list, but same reference picture (same POC)

Spatial scaling
   (3) Same reference picture list, but different reference picture (different POC)
   (4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
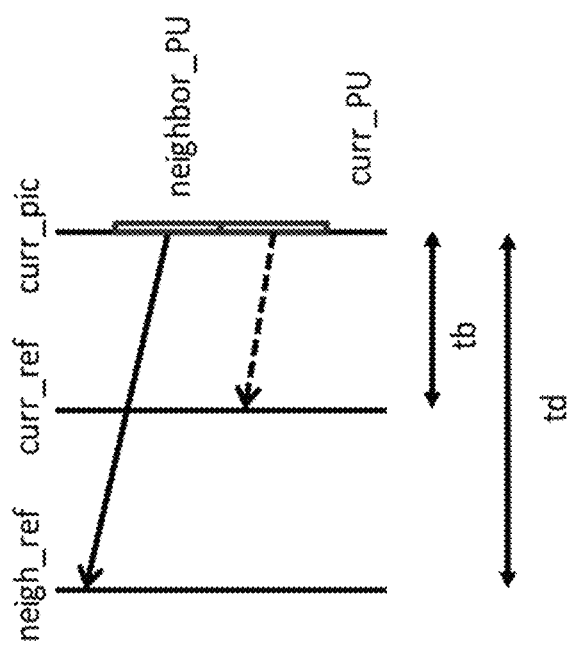
FIG. 9 shows an example of motion vector scaling for spatial motion vector candidates.

In a spatial scaling process, the motion vector of the neighboring PU is scaled in a similar manner as for temporal scaling, as depicted as FIG. 9. The main difference is that the reference picture list and index of current PU is given as input; the actual scaling process is the same as that of temporal scaling.

2.1.3.3. Temporal Motion Vector Candidates

Apart for the reference picture index derivation, all processes for the derivation of temporal merge candidates are the same as for the derivation of spatial motion vector candidates (see FIG. 6). The reference picture index is signaled to the decoder.

2.2. Sub-CU Based Motion Vector Prediction Methods in JEM

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In the spatio-temporal motion vector prediction (STMVP) method, motion vectors of the sub-CUs are derived recursively by using the temporal motion vector predictor and spatial neighboring motion vector.

2.2.1. Alternative Temporal Motion Vector Prediction

Figure 10:
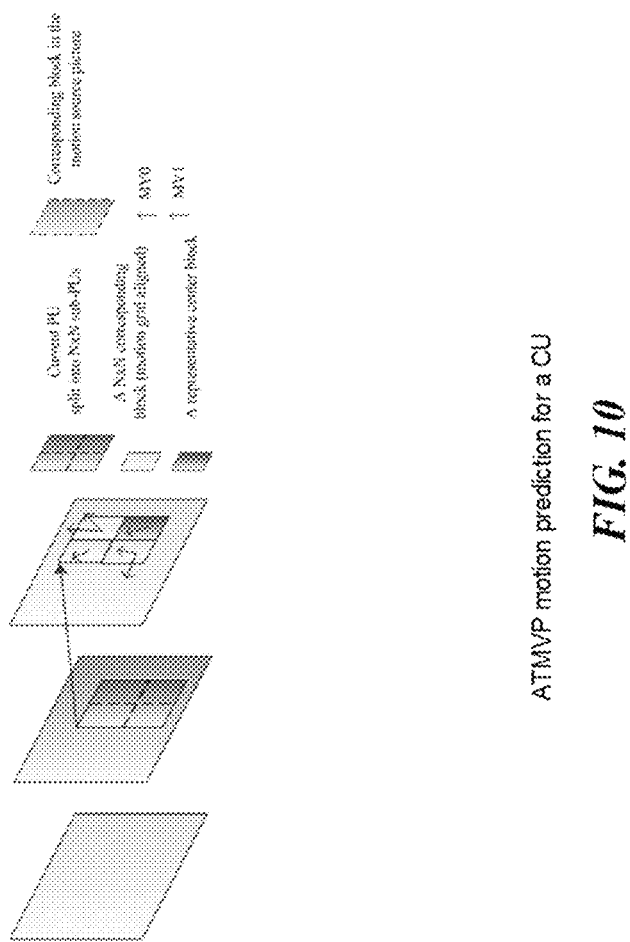
FIG. 10 shows an example of alternative temporal motion vector prediction (ATMVP).

FIG. 10 shows an example of alternative temporal motion vector prediction (ATMVP). In the alternative temporal motion vector prediction (ATMVP) method, the motion vectors temporal motion vector prediction (TMVP) is modified by fetching multiple sets of motion information (including motion vectors and reference indices) from blocks smaller than the current CU. The sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighboring blocks of the current CU. To avoid the repetitive scanning process of neighboring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.2.2. Spatio-Temporal Motion Vector Prediction (STMVP)

Figure 11:
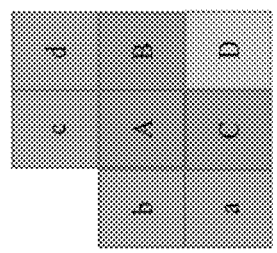
FIG. 11 shows an example of spatial-temporal motion vector prediction.

In this method, the motion vectors of the sub-CUs are derived recursively, following raster scan order. FIG. 11 illustrates this concept. Let us consider an 8×8 CU which contains four 4×4 sub-CUs A, B, C, and D. The neighboring 4×4 blocks in the current frame are labelled as a, b, c, and d.

The motion derivation for sub-CU A starts by identifying its two spatial neighbors. The first neighbor is the N×N block above sub-CU A (block c). If this block c is not available or is intra coded the other N×N blocks above sub-CU A are checked (from left to right, starting at block c). The second neighbor is a block to the left of the sub-CU A (block b). If block b is not available or is intra coded other blocks to the left of sub-CU A are checked (from top to bottom, staring at block b). The motion information obtained from the neighboring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.3. Sub-CU Motion Prediction Mode Signaling

The sub-CU modes are enabled as additional merge candidates and there is no additional syntax element necessary to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context-coded by CABAC. While in HEVC, only the first bin is context coded and the remaining bins are context by-pass coded.

2.3. Local Illumination Compensation in JEM

Local Illumination Compensation (LIC) is based on a linear model for illumination changes, using a scaling factor a and an offset b. And it is enabled or disabled adaptively for each inter-mode coded coding unit (CU).

Figure 12:
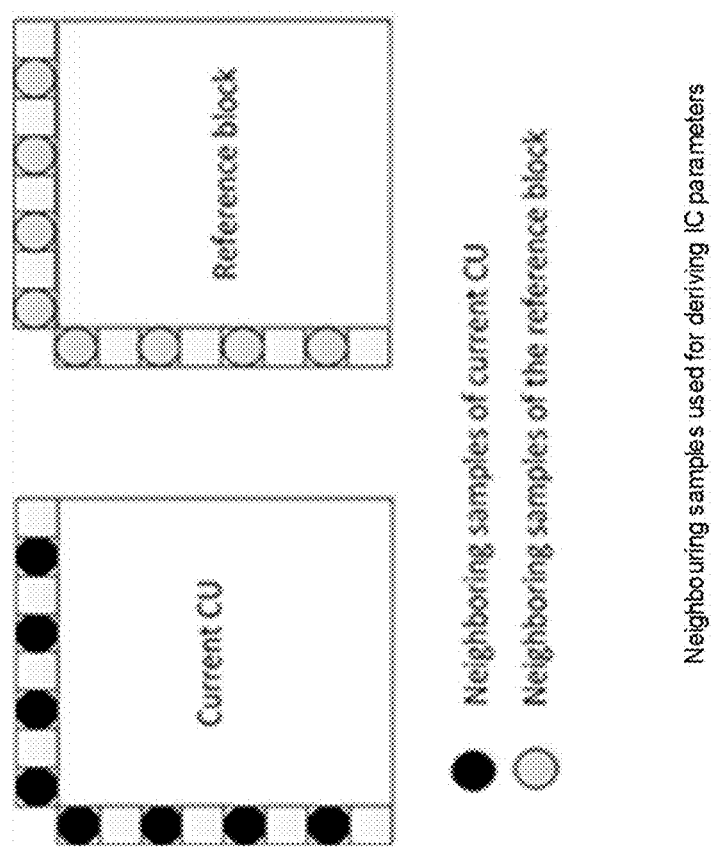
FIG. 12 shows an example of neighboring samples for deriving local illumination compensation parameters.

When LIC applies for a CU, a least square error method is employed to derive the parameters a and b by using the neighboring samples of the current CU and their corresponding reference samples. More specifically, as illustrated in FIG. 12, the subsampled (2:1 subsampling) neighboring samples of the CU and the corresponding samples (identified by motion information of the current CU or sub-CU) in the reference picture are used.

2.2.4. Derivation of Prediction Blocks

The IC parameters are derived and applied for each prediction direction separately. For each prediction direction, a first prediction block is generated with the decoded motion information, then a temporary prediction block is obtained via applying the LIC model. Afterwards, the two temporary prediction blocks are utilized to derive the final prediction block.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively. To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.3 Inter Prediction Methods in VVC

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.3.1. Coding Block Structure in VVC

In VVC, a QuadTree/BinaryTree/MulitpleTree (QT/BT/TT) structure is adopted to divide a picture into square or rectangle blocks.

Besides QT/BT/TT, separate tree (a/k/a Dual coding tree) is also adopted in VVC for I-frames. With separate tree, the coding block structure are signaled separately for the luma and chroma components.

2.3.2 Adaptive Motion Vector Difference Resolution

In HEVC, motion vector differences (MVDs) (between the motion vector and predicted motion vector of a PU) are signaled in units of quarter luma samples when use_integer_mv_flag is equal to 0 in the slice header. In the VVC, a locally adaptive motion vector resolution (AMVR) is introduced. In the VVC, MVD can be coded in units of quarter luma samples, integer luma samples or four luma samples (i.e., ¼-pel, 1-pel, 4-pel). The MVD resolution is controlled at the coding unit (CU) level, and MVD resolution flags are conditionally signaled for each CU that has at least one non-zero MVD components.

For a CU that has at least one non-zero MVD components, a first flag is signaled to indicate whether quarter luma sample MV precision is used in the CU. When the first flag (equal to 1) indicates that quarter luma sample MV precision is not used, another flag is signaled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

2.3.3 Affine Motion Compensation Prediction

Figure 13B:
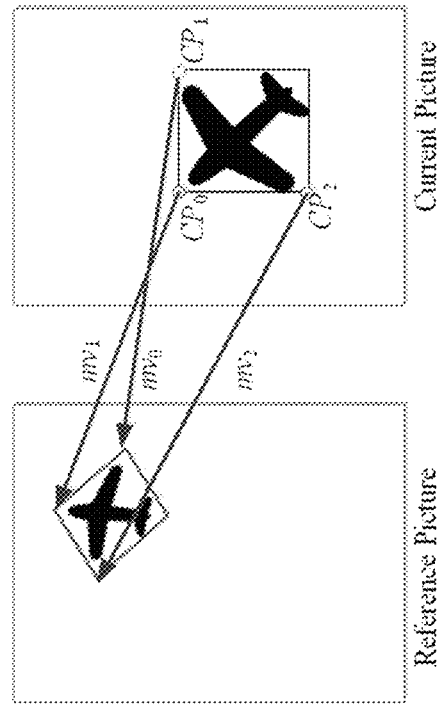
FIGS. 13A and 13B show illustrations in connection with a 4-parameter affine model and a 6-parameter affine model respectively.
Figure 13A:
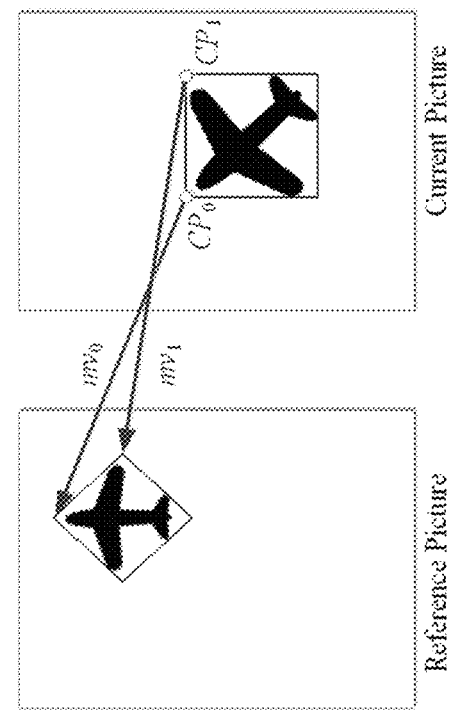

In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIG. 13, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad (2)$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block and $(mv^h(x,y), mv^v(x,y))$ is the motion vector derived for a sample located at (x, y). The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 14:
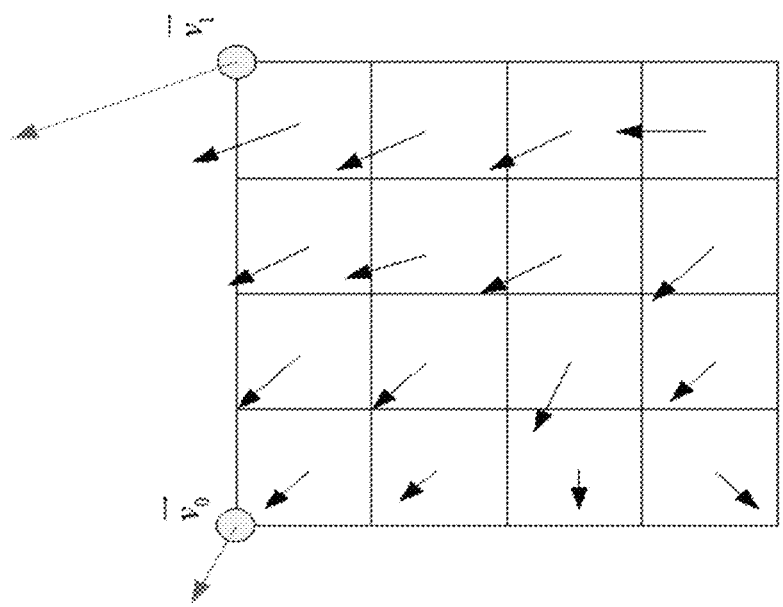
FIG. 14 shows an example of an affine motion vector field per sub-block.

In order to further simplify the motion compensation prediction, sub-block based affine transform prediction is applied. To derive motion vector of each M×N (both M and N are set to 4 in current VVC) sub-block, the motion vector of the center sample of each sub-block, as shown in FIG. 14, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

After MCP, the high accuracy motion vector of each sub-block is rounded and saved as the same accuracy as the normal motion vector.

2.3.3.1. Signaling of Affine Prediction

Similar to the translational motion model, there are also two modes for signaling the side information due affine prediction. They are AFFINE_INTER and AFFINE_MERGE modes.

2.3.3.2. AF_INTER Mode

For CUs with both width and height larger than 8, AF_INTER mode can be applied. An affine flag in CU level is signaled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 17), and the estimated CPMVs are signaled. In addition, the index of affine AMVP candidate from which the estimated CPMVs are derived is further signaled.

1) Inherited Affine Motion Predictors

Figure 16:
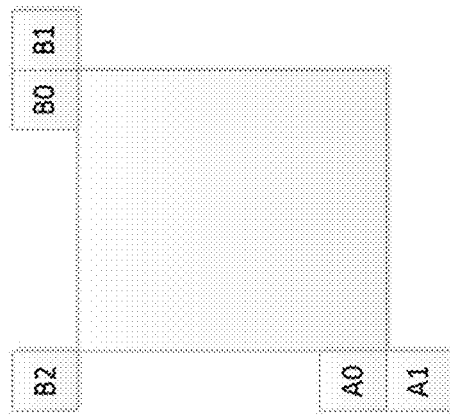
FIG. 16 shows an example of motion vector prediction for affine inter mode for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 16.

Figures 18A, 18B:
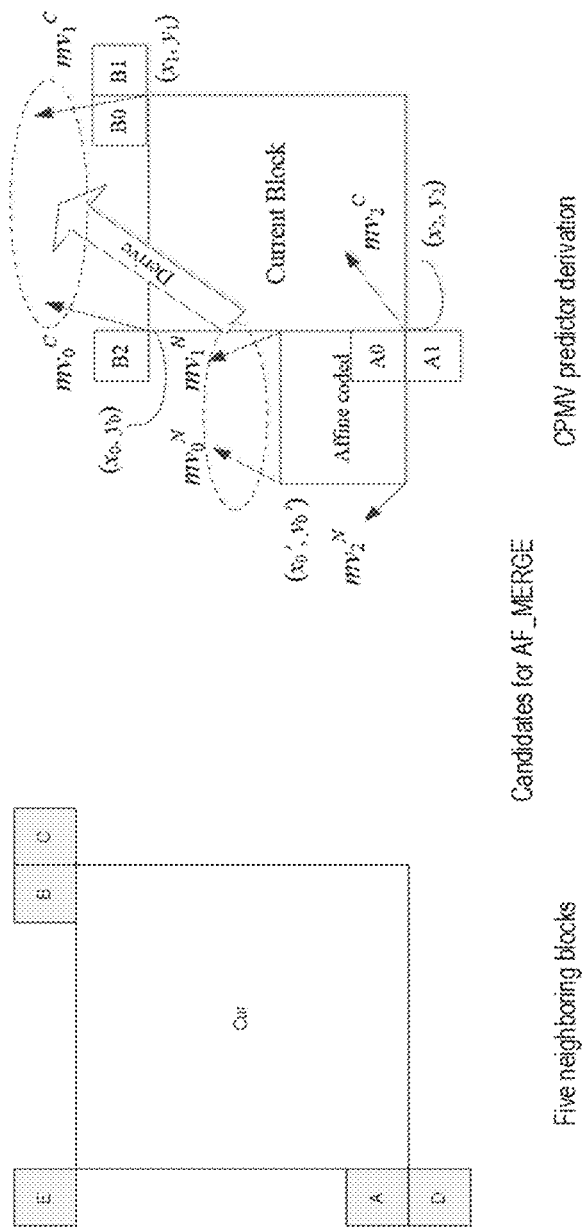
FIGS. 18A and 18B show illustrations in connection with an affine merge mode.

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 18B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 17:
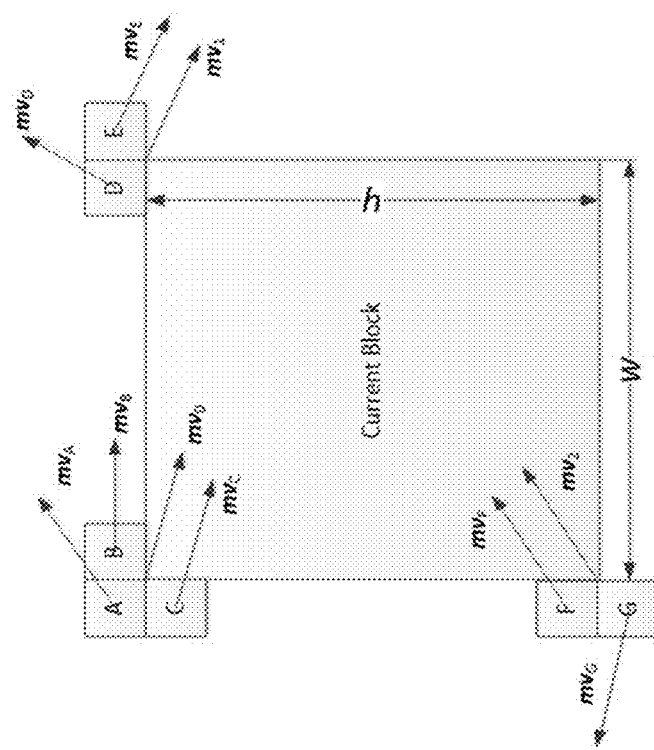
FIG. 17 shows an example of motion vector prediction for affine inter mode for constructed affine candidates.

A constructed affine motion predictor consists of control-point motion vectors (CPMVs) that are derived from neighboring inter coded blocks, as shown in FIG. 17, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.

2) Derive an affine motion predictor by setting all CPMVs equal to $\overline{mv}_1$ if available.

3) Derive an affine motion predictor by setting all CPMVs equal to $\overline{mv}_0$ if available.

4) Derive an affine motion predictor by setting all CPMVs equal to HEVC TMVP if available.

5) Derive an affine motion predictor by setting all CPMVs to zero MV.

Note that $\overline{mv}_i$ is already derived in constructed affine motion predictor.

Figure 15B:
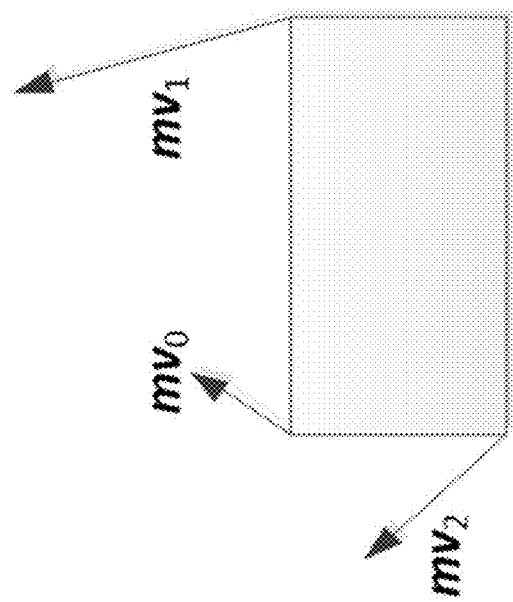
FIGS. 15A and 15B show examples of a 4-parameter affine model and a 6-parameter affine model respectively.
Figure 15A:
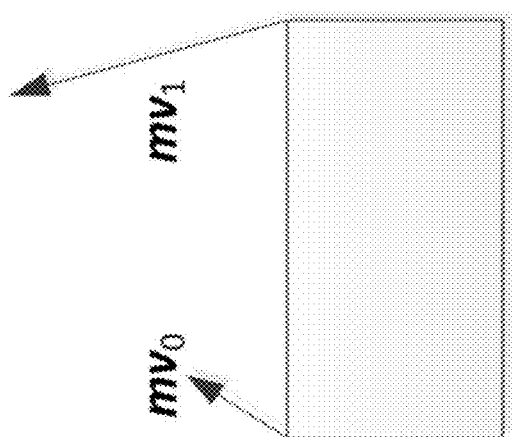

In AF_INTER mode, when 4/6-parameter affine mode is used, ⅔ control points can be used, and therefore ⅔ MVD needs to be coded for these control points, as shown in FIG. 15. In JVET-K0337, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 15B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.3.3.3. AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 18A (denoted by A, B, C, D, E in order). For example, if the neighbour left bottom block is coded in affine mode as denoted by A0 in FIG. 18B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks store the MVs used for MC.

After the CPMV of the current CU $mv_0^C$, $mv_1^C$ and $mv_2^C$ are derived, according to the simplified affine motion model Equation (1) and (2), the MVF of the current CU is generated. In order to identify whether the current CU is coded with AF_MERGE mode, an affine flag is signaled in the bitstream when there is at least one neighbour block is coded in affine mode.

In JVET-L0142 and JVET-L0632, an affine merge candidate list is constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

Figure 19:
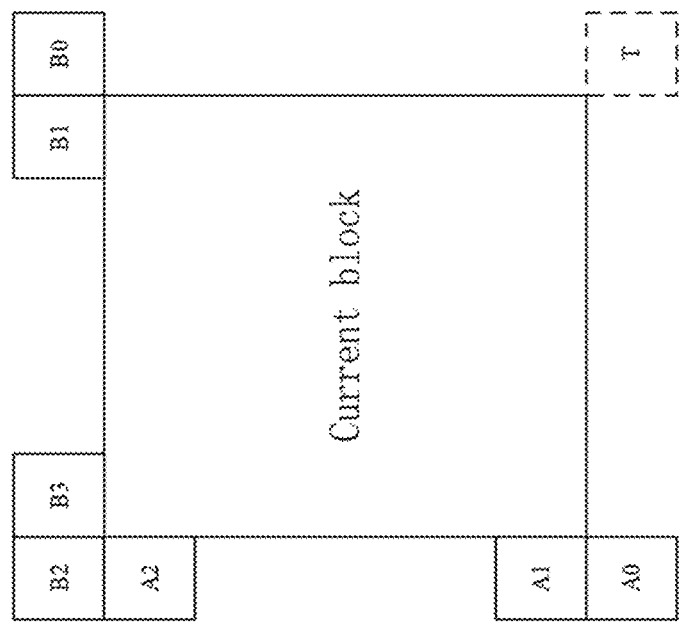
FIG. 19 shows examples of candidate positions for an affine merge mode

If the number of candidates in affine merge candidate list is less than MaxNumAffineCand (e.g., 5), constructed affine candidates are inserted into the candidate list. Constructed affine candidate means the candidate is constructed by combining the neighbor motion information of each control point.
  a) The motion information for the control points is derived firstly from the specified spatial neighbors and temporal neighbor shown in FIG. 19. CPk (k=1, 2, 3, 4) represents the k-th control point. A0, A1, A2, B0, B1, B2 and B3 are spatial positions for predicting CPk (k=1, 2, 3); T is temporal position for predicting CP4.
     The coordinates of CP1, CP2, CP3 and CP4 is (0, 0), (W, 0), (H, 0) and (W, H), respectively, where W and H are the width and height of current block.
  The motion information of each control point is obtained according to the following priority order:
    For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.
    For CP2, the checking priority is B1→B0.
    For CP3, the checking priority is A1→A0.
    For CP4, T is used.
  b) Secondly, the combinations of controls points are used to construct an affine merge candidate.
    I. Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.
    II. Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.
    III. The combinations of constructed affine candidates are inserted into to candidate list as following order:
      {CP1, CP2, CP3}, {CP1, CP2, CP4}, {CP1, CP3, CP4}, {CP2, CP3, CP4}, {CP1, CP2}, {CP1, CP3}
      i. For each combination, the reference indices of list X for each CP are checked, if they are all the same, then this combination has valid CPMVs for list X. If the combination does not have valid CPMVs for both list 0 and list 1, then this combination is marked as invalid. Otherwise, it is valid, and the CPMVs are put into the sub-block merge list.

3) Padding with Zero Motion Vectors

If the number of candidates in affine merge candidate list is less than 5, zero motion vectors with zero reference indices are insert into the candidate list, until the list is full. More specifically, for the sub-block merge candidate list, a 4-parameter merge candidate with MVs set to (0, 0) and prediction direction set to uni-prediction from list 0 (for P slice) and bi-prediction (for B slice).

2.3.4. Merge with Motion Vector Differences (MMVD)

In JVET-L0054, ultimate motion vector expression (UMVE, also known as MMVD) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidates is equal to 1, Base candidate IDX is not signaled.

Distance index is motion magnitude information. Distance index indicates the pre-defined distance from the starting point information. Pre-defined distance is as follows:

TABLE 2

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| | Direction IDX | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

Figure 20:
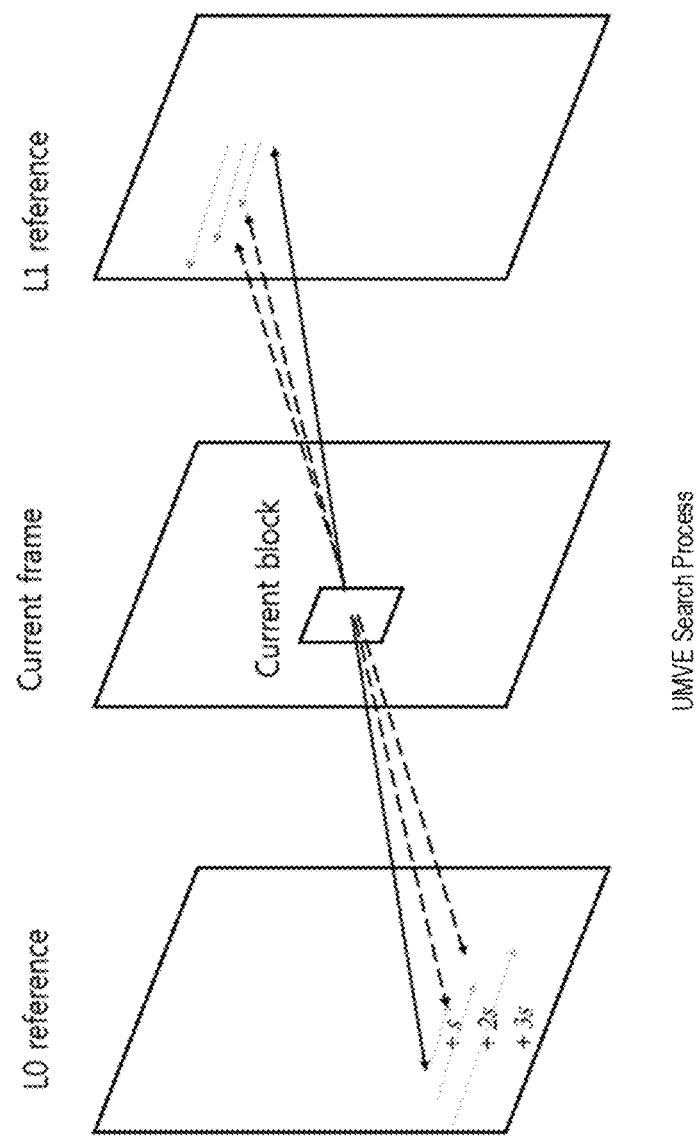
FIG. 20 shows an example of an ultimate vector expression (UMVE) search process.
Figure 21:
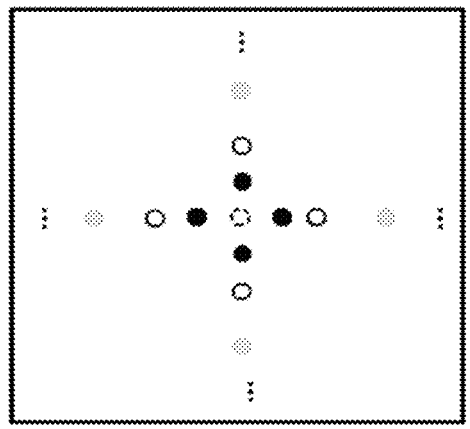
FIG. 21 shows an example of a UMVE search point.
Figure 21:
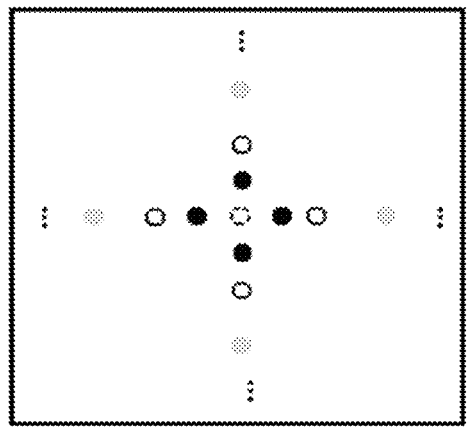

UMVE is also known as Merge with MV Differences (MMVD). FIG. 20 shows an example of an ultimate vector expression (UMVE) search process. FIG. 21 shows an example of a UMVE search point.

2.3.5. Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

Figure 22:
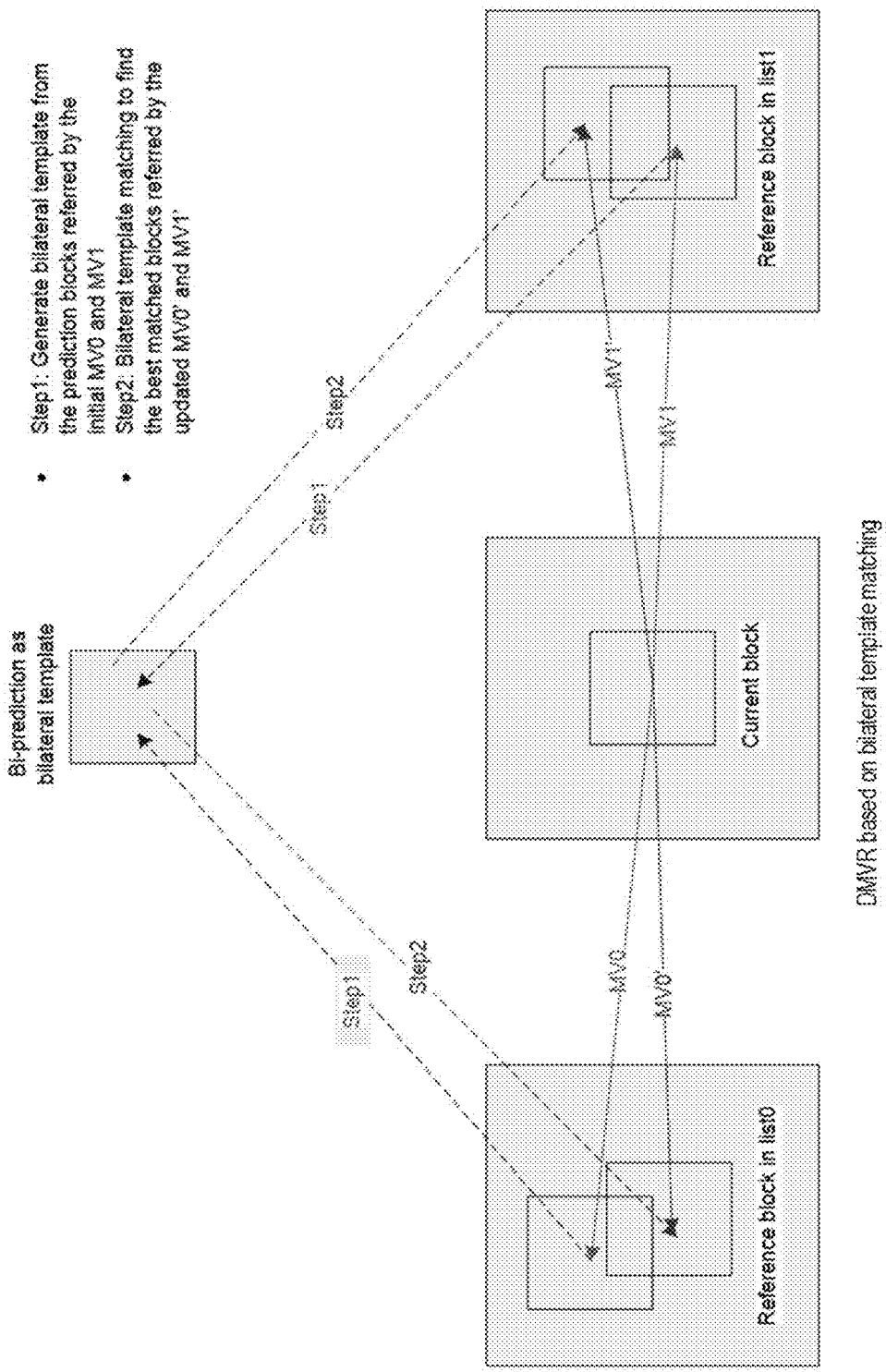
FIG. 22 shows an example of decoder-side motion video refinement (DMVR).

In JEM design, the motion vectors are refined by a bilateral template matching process. The bilateral template matching applied in the decoder to perform a distortion-based search between a bilateral template and the reconstruction samples in the reference pictures in order to obtain a refined MV without transmission of additional motion information. An example is depicted in FIG. 22. The bilateral template is generated as the weighted combination (i.e. average) of the two prediction blocks, from the initial MV0 of list0 and MV1 of list1, respectively, as shown in FIG. 22. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 22, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

To further simplify the process of DMVR, JVET-M0147 proposed several changes to the design in JEM. More specifically, the adopted DMVR design to VTM-4.0 (to be released soon) has the following main features:

Early termination w/(0,0) position SAD between list0 and list1
Block sizes for DMVR W*H>=64 && H>=8
Split the CU into multiple of 16×16 sub-blocks for DMVR of CU size >16*16
Reference block size (W+7)*(H+7) (for luma)
25 points SAD-based integer-pel search (i.e. (+−) 2 refinement search range, single stage)
Bilinear-interpolation based DMVR
MVD mirroring between list0 and list1 to allow bilateral matching
"Parametric error surface equation" based sub-pel refinement
Luma/chroma MC w/reference block padding (if needed)
Refined MVs used for MC and TMVPs only 2.3.6. Combined Intra and Inter Prediction In JVET-L0100, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as ($w\_intra_i$, $w\_inter_i$), where i is from 1 to 4 and ($w\_intra_1$, $w\_inter_1$)=(6, 2), ($w\_intra_2$, $w\_inter_2$)=(5, 3), ($w\_intra_3$, $w\_inter_3$)=(3, 5), and ($w\_intra_4$, $w\_inter_4$)=(2, 6), will be applied to a corresponding region. ($w\_intra_1$, $w\_inter_1$) is for the region closest to the reference samples and ($w\_intra_4$, $w\_inter_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

2.4 In-Loop Reshaping (ILR) in JVET-M0427

The in-loop reshaping (ILR) is also known as Luma Mapping with Chroma Scaling (LMCS).

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT[$Y_i$]. The other LUT is an inverse LUT, InvLUT, that maps altered code values $Y_r$ to $\hat{Y}_i$: $\hat{Y}_i$=InvLUT[$Y_r$]. ($\hat{Y}_i$ represents the reconstruction values of $Y_i$).

2.4.1 PWL Model

Conceptually, piece-wise linear (PWL) is implemented in the following way. Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2^{FP\_PREC-1})>>FP\_PREC)+c$$

where m is scalar, c is an offset, and FP_PREC is a constant value to specify the precision.

In CE-12 software, the PWL model is used to precompute the 1024-entry FwdLUT and InvLUT mapping tables; but the PWL model also allows implementations to calculate identical mapping values on-the-fly without pre-computing the LUTs.

2.4.2. Test CE12-2

2.4.2.1. Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 23:
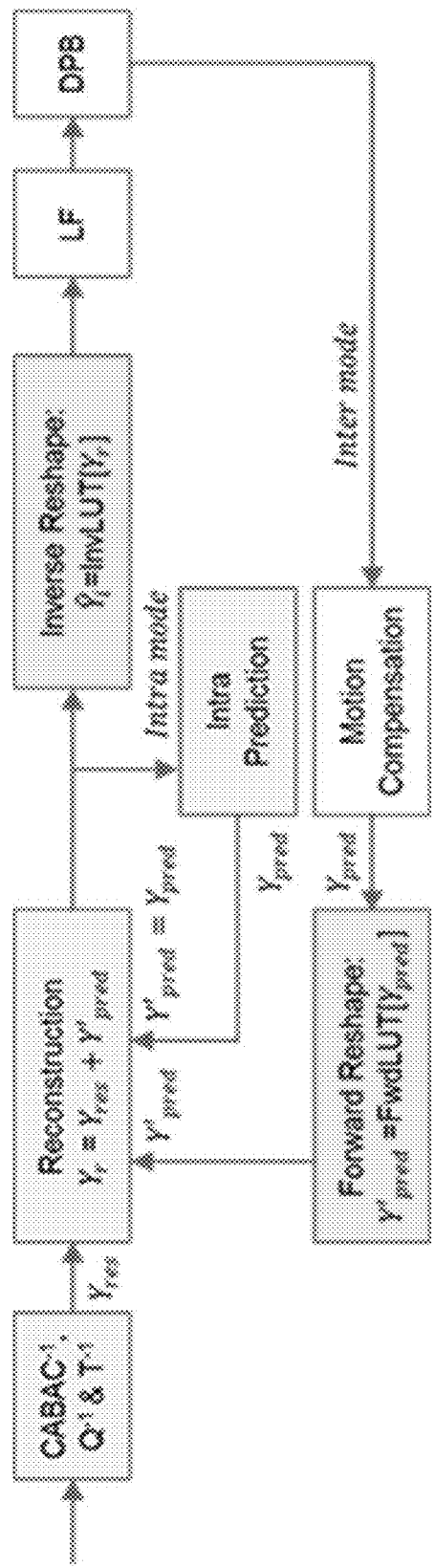
FIG. 23 shows a block diagram flowchart of decoding with reshaping step.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 23 shows the block diagram of the CE12-2 decoding process based on mode.

CE12-2 also tests 16-piece piece-wise linear (PWL) models for luma and chroma residue scaling instead of the 32-piece PWL models of CE12-1.

Inter slice reconstruction with in-loop luma reshaper in CE12-2 (light-green shaded blocks indicate signal in reshaped domain: luma residue; intra luma predicted; and intra luma reconstructed)

2.4.2.2. Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra, the reconstructed luma is averaged.

For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values 2.4.2.3. Signaling of ILR Side Information The parameters are (currently) sent in the tile group header (similar to ALF). These reportedly take 40-100 bits.

The following tables are based on version 9 of JVET-L1001. The syntax to be added is highlighted below in underlined italicized font.

In 7.3.2.1 Sequence parameter set RBSP syntax:

|  | Descriptor |
|---|---|
| seq_parameter_set_rbsp( ) { |  |
|   sps_seq_parameter_set_id | ue(v) |
|   ... |  |
|   sps_triangle_enabled_flag | u(1) |
|   sps_ladf_enabled_flag | u(1) |
|   if ( sps_ladf_enabled_flag ) { |  |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++) { |  |
|       sps_ladf_qp_offset[ i ] | se(v) |
|       sps_ladf_delta_threshold_minus1[ i ] | ue(v) |
|     } |  |
|   } |  |
|   *sps_reshaper_enabled_flag* | *u(1)* |
|   rbsp_trailing_bits( ) |  |
| } |  |

In 7.3.3.1 General tile group header syntax:

|  | Descriptor |
|---|---|
| tile_group_header( ) { |  |
|   ... |  |
|   if( num_tiles_in_tile_group_minus1 > 0 ) { |  |
|     offset_len_minus1 | ue(v) |
|     for( i = 0; i < num_tiles_in_tile_group_minus1; i++) |  |
|       entry_point_offset_minus1[ i ] | u(v) |
|   } |  |
|   *if ( sps_reshaper_enabled_flag ) {* |  |
|     *tile_group_reshaper_model_present_flag* | *u(1)* |
|     *if ( tile_group_reshaper_model_present_flag )* |  |
|       *tile_group_reshaper_model ( )* |  |
|     *tile_group_reshaper_enable_flag* | *u(1)* |
|     *if ( tile_group_reshaper_enable_flag && (!( qtbtt_dual_tree_intra_flag && tile_group_type == I ) ) )* |  |
|       *tile_group_reshaper_chroma_residual_scale_flag* | *u(1)* |
|   *}* |  |
|   byte_alignment( ) |  |
| } |  |

A new syntax table tile group reshaper model can be added as follows:

| | Descriptor |
|---|---|
| tile_group_reshaper_model ( ) { | |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i++ ) { | |
|     reshape_model_bin_delta_abs_CW [ i ] | u(v) |
|     if ( reshaper_model_bin_delta_abs_CW[ i ] ) > 0 ) | |
|       reshaper_model_bin_delta_sign_CW_flag[ i ] | u(1) |
|   } | |
| } | |

In General sequence parameter set RBSP semantics, the following semantics can be added:

sps_reshaper_enabled_flag equal to 1 specifies that reshaper is used in the coded video sequence (CVS). sps_reshaper_enabled_flag equal to 0 specifies that reshaper is not used in the CVS.

In tile group header syntax, the following semantics can be added:

tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.

tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0.

tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.

The tile_group_reshaper_model( ) syntax can be added as follows:

reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.

reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx−reshape_model_delta_max_bin_idx.

reshaper_model_bin_delta_abs_cw_prec_minus1 plus 1 specifies the number of bits used for the representation of the syntax reshape_model_bin_delta_abs_CW[i].

reshape_model_bin_delta_abs_CW[i] specifies the absolute delta codeword value for the ith bin.

reshaper_model_bin_delta_sign_CW_flag[i] specifies the sign of reshape_model_bin_delta_abs_CW[i] as follows:

If reshape_model_bin_delta_sign_CW_flag[i] is equal to 0, the corresponding variable RspDeltaCW[i] is a positive value.

Otherwise (reshape_model_bin_delta_sign_CW_flag[i] is not equal to 0), the corresponding variable RspDeltaCW[i] is a negative value.

When reshape_model_bin_delta_sign_CW_flag[i] is not present, it is inferred to be equal to 0. The variable RspDeltaCW[i]=(1−2*reshape_model_bin_delta_sign_CW [i])*reshape_model_bin_delta_abs_CW[i].

The variable RspCW[i] is derived as following steps:

The variable OrgCW is set equal to $(1<<BitDepth_Y)/$(MaxBinIdx+1).

If reshaper_model_min_bin_idx<=i<=reshaper_model_max_bin_idx RspCW[i]=OrgCW+RspDeltaCW[i].

Otherwise, RspCW[i]=0.

The value of RspCW [i] shall be in the range of 32 to 2*OrgCW−1 if the value of $BitDepth_Y$ is equal to 10.

The variables InputPivot[i] with i in the range of 0 to MaxBinIdx+1, inclusive are derived as InputPivot[i]= i*OrgCW.

The variable ReshapePivot[i] with i in the range of 0 to MaxBinIdx+1, inclusive, the variables ScaleCoef[i] and InvScaleCoeff[i] with i in the range of 0 to MaxBinIdx, inclusive, can be derived as follows:

```
shiftY = 14
ReshapePivot[ 0 ] = 0;
for( i = 0; i <= MaxBinIdx ; i++) {
    ReshapePivot[ i + 1 ] = ReshapePivot[ i ] + RspCW[ i ]
    ScaleCoef[ i ] = ( RspCW[ i ] * (1 << shiftY) + (1 <<
    (Log2(OrgCW) − 1))) >> (Log2(OrgCW))
    if ( RspCW[ i ] == 0 )
        InvScaleCoeff[ i ] = 0
    else
        InvScaleCoeff[ i ] = OrgCW * (1 << shiftY) / RspCW[ i ]
}
```

The variable ChromaScaleCoef[i] with i in the range of 0 to MaxBinIdx, inclusive, can be derived as follows:

ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};

```
shiftC = 11
-  if ( RspCW[ i ] == 0 )
       ChromaScaleCoef [ i ] = (1 << shiftC)
-  Otherwise (RspCW[ i ] != 0), ChromaScaleCoef[ i ] =
   ChromaResidualScaleLut[RspCW[ i ] >> 1]
```

2.4.2.4. Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual(s) is/are generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases. The prediction signal, for example, comprises a prediction block of same size as the current block.

Current block is intra-coded

Current block is coded as CPR (current picture referencing, aka intra block copy, IBC)

Current block is coded as combined inter-intra mode (CIIP) and the forward reshaping is disabled for the intra prediction block 2.5. Virtual Pipelining Data Units (VPDU)

Virtual pipeline data units (VPDUs) are defined as non-overlapping M×M-luma(L)/N×N-chroma(C) units in a picture. In hardware decoders, successive VPDUs are processed by multiple pipeline stages at the same time; different stages process different VPDUs simultaneously. The VPDU size is roughly proportional to the buffer size in most pipeline stages, so it is said to be very important to keep the VPDU size small. In HEVC hardware decoders, the VPDU size is set to the maximum transform block (TB) size. Enlarging the maximum TB size from 32×32-L/16×16-C (as in HEVC) to 64×64-L/32×32-C (as in the current VVC) can bring coding gains, which results in 4× of VPDU size (64×64-L/32×32-C) expectedly in comparison with HEVC. However, in addition to quadtree (QT) coding unit (CU) partitioning, ternary tree (TT) and binary tree (BT) are adopted in VVC for achieving additional coding gains, and TT and BT splits can be applied to 128×128-L/64×64-C coding tree blocks (CTUs) recursively, which is said to lead to 16× of VPDU size (128×128-L/64×64-C) in comparison with HEVC.

In current design of VVC, the VPDU size is defined as 64×64-L/32×32-C.

2.6. APS

An Adaptation Parameter Set (APS) is adopted in VVC to carry ALF parameters. The tile group header contains an aps_id which is conditionally present when ALF is enabled. The APS contains an aps_id and the ALF parameters. A new NUT (NAL unit type, as in AVC and HEVC) value is assigned for APS (from JVET-M0132). For the common test conditions in VTM-4.0 (to appear), it is suggested just using aps_id=0 and sending the APS with each picture. For now, the range of APS ID values will be 0 . . . 31 and APS_s can be shared across pictures (and can be different in different tile groups within a picture). The ID value should be fixed-length coded when present. ID values cannot be re-used with different content within the same picture.

2.7. Post-Reconstruction Filters 2.7.1 Diffusion Filter (DF)

In JVET-L0157, diffusion filter is proposed, wherein the intra/inter prediction signal of the CU may be further modified by diffusion filters.

2.7.1.1. Uniform Diffusion Filter

The Uniform Diffusion Filter is realized by convolving the prediction signal with a fixed mask that is either given as $h^I$ or as $h^{IV}$, defined below.

Besides the prediction signal itself, one line of reconstructed samples left and above of the block are used as an input for the filtered signal, where the use of these reconstructed samples can be avoided on inter blocks.

Let pred be the prediction signal on a given block obtained by intra or motion compensated prediction. In order to handle boundary points for the filters, the prediction signal needs to be extended to a prediction signal $pred_{ext}$. This extended prediction can be formed in two ways: Either, as an intermediate step, one line of reconstructed samples left and above the block are added to the prediction signal and then the resulting signal is mirrored in all directions. Or only the prediction signal itself is mirrored in all directions. The latter extension is used for inter blocks. In this case, only the prediction signal itself comprises the input for the extended prediction signal $pred_{ext}$.

If the filter $h^I$ is to be used, it is proposed to replace the prediction signal pred by $h^I*pred,$ using the aforementioned boundary extension. Here, the filter mask $h^I$ is given as $$h^I = (0.25)^4 \begin{pmatrix} 0 & 0 & 0 & 0 & 1 & 0 & 0 & 0 & 0 \\ 0 & 0 & 0 & 4 & 0 & 4 & 0 & 0 & 0 \\ 0 & 0 & 6 & 0 & 16 & 0 & 6 & 0 & 0 \\ 0 & 4 & 0 & 24 & 0 & 24 & 0 & 4 & 0 \\ 1 & 0 & 16 & 0 & 36 & 0 & 16 & 0 & 1 \\ 0 & 4 & 0 & 24 & 0 & 24 & 0 & 4 & 0 \\ 0 & 0 & 6 & 0 & 16 & 0 & 6 & 0 & 0 \\ 0 & 0 & 0 & 4 & 0 & 4 & 0 & 0 & 0 \\ 0 & 0 & 0 & 0 & 1 & 0 & 0 & 0 & 0 \end{pmatrix}.$$

If the filter $h^{IV}$ is to be used, it is proposed to replace the prediction signal pred by $h^{IV}*pred.$ Here, the filter $h^{IV}$ is given as $h^{IV}=h^I*h^I*h^I*h^I$.

2.7.1.2. Directional Diffusion Filter

Instead of using signal adaptive diffusion filters, directional filters, a horizontal filter $h^{hor}$ and a vertical filter $h^{ver}$, are used which still have a fixed mask. More precisely, the uniform diffusion filtering corresponding to the mask $h^I$ of the previous section is simply restricted to be either applied only along the vertical or along the horizontal direction. The vertical filter is realized by applying the fixed filter mask $$h_{ver} = (0.5)^4 \begin{pmatrix} 1 \\ 0 \\ 4 \\ 0 \\ 6 \\ 0 \\ 4 \\ 0 \\ 1 \end{pmatrix}$$

to the prediction signal and the horizontal filter is realized by using the transposed mask $h^{hor}=h_{ver}^t$.

2.7.2. Bilateral Filter (BF)

Bilateral filter is proposed in JVET-L0406, and it is always applied to luma blocks with non-zero transform coefficients and slice quantization parameter larger than 17. Therefore, there is no need to signal the usage of the bilateral filter. Bilateral filter, if applied, is performed on decoded samples right after the inverse transform. In addition, the filter parameters, i.e., weights are explicitly derived from the coded information.

Figure 24:
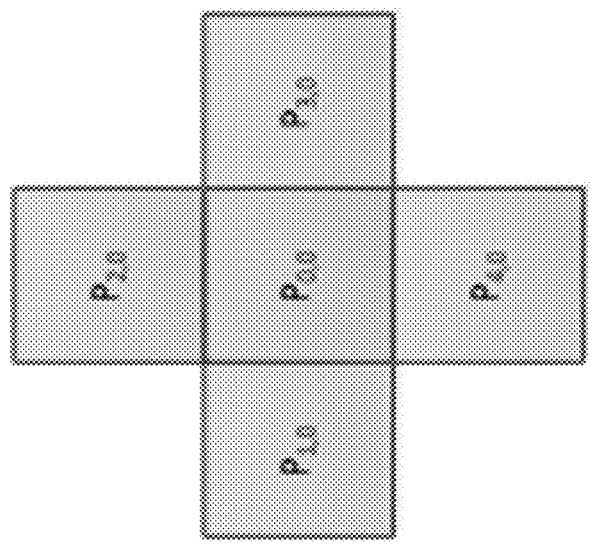
FIG. 24 shows examples of samples in a bilateral filter.

The filtering process is defined as:

$$P_{0,0}' = P_{0,0} + \Sigma_{k=1}^{K} W_k(\text{abs}(P_{k,0} - P_{0,0})) \times (P_{k,0} - P_{0,0}), \quad (1)$$

where $P_{0,0}$ is the intensity of the current sample and $P_{0,0}'$ is the modified intensity of the current sample, $P_{k,0}$ and $W_k$ are the intensity and weighting parameter for the k-th neighboring sample, respectively. An example of one current sample and its four neighboring samples (i.e., K=4) is depicted in FIG. 24.

More specifically, the weight $W_k(x)$ associated with the k-th neighboring sample is defined as follows:

$$W_k(x) = Distance_k \times Range_k(x) \quad (2)$$

wherein $$Distance_k = e^{\left(-\frac{10000}{2\sigma_d^2}\right)} / 1 + 4 * e^{\left(-\frac{10000}{2\sigma_d^2}\right)}, \quad (3)$$

$$Range_k(x) = e^{\left(-\frac{x^2}{8*(QP-17)*(QP-17)}\right)}$$

and $\sigma_d$ is dependent on the coded mode and coding block sizes. The described filtering process is applied to intra-coded blocks, and inter-coded blocks when TU is further split, to enable parallel processing.

To better capture statistical properties of video signal, and improve performance of the filter, weights function resulted from Equation (2) are being adjusted by the $\sigma_d$ parameter, tabulated in Table 4 as being dependent on coding mode and parameters of block partitioning (minimal size).

TABLE 4

Value of $\sigma_d$ for different block sizes and coding modes

| Min (block width, block height) | Intra mode | Inter mode |
|---|---|---|
| 4 | 82 | 62 |
| 8 | 72 | 52 |
| Other | 52 | 32 |

Figure 25:
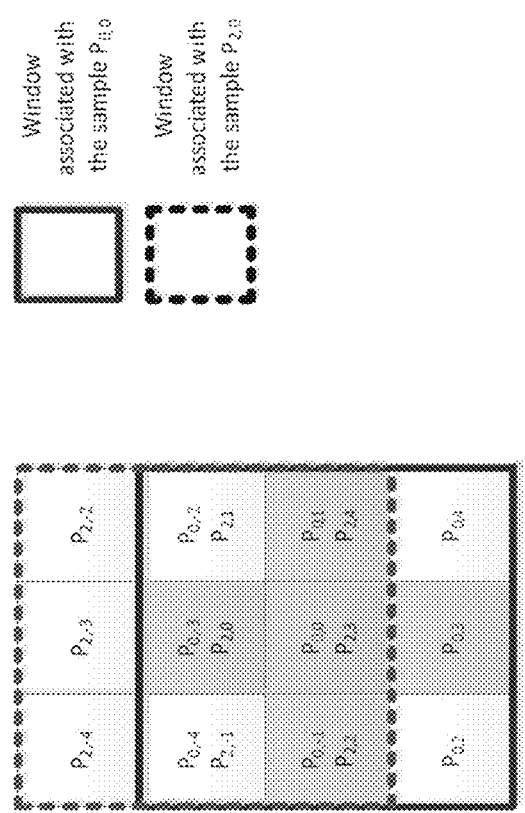
FIG. 25 shows examples of windowed samples utilized in weight calculations.

To further improve the coding performance, for inter-coded blocks when TU is not split, the intensity difference between current sample and one of its neighboring samples is replaced by a representative intensity difference between two windows covering current sample and the neighboring sample. Therefore, the equation of filtering process is revised to:

$$P_{0,0}' = P_{0,0} + \sum_{k=1}^{N} W_k \left( \frac{1}{M} \sum_{m=-M/2}^{M/2} \text{abs}(P_{k,m} - P_{0,m}) \right) \times (P_{k,0} - P_{0,0}) \quad (4)$$

wherein $P_{k,m}$ and $P_{0,m}$ represent the m-th sample value within the windows centered at $P_{k,0}$ and $P_{0,0}$, respectively. In this proposal, the window size is set to 3×3. An example of two windows covering $P_{2,0}$ and $P_{0,0}$ are depicted in FIG. 25.

2.7.3. Hadamard Transform Domain Filter (HF)

In JVET-K0068, in-loop filter in 1D Hadamard transform domain which is applied on CU level after reconstruction and has multiplication free implementation. Proposed filter is applied for all CU blocks that meet the predefined condition and filter parameters are derived from the coded information.

Proposed filtering is always applied to luma reconstructed blocks with non-zero transform coefficients, excluding 4×4 blocks and if slice quantization parameter is larger than 17. The filter parameters are explicitly derived from the coded information. Proposed filter, if applied, is performed on decoded samples right after inverse transform.

For each pixel from reconstructed block pixel processing comprises the following steps:

Scan 4 neighboring pixels around processing pixel including current one according to scan pattern
4 point Hadamard transform of read pixels
Spectrum filtering based on the following formula:

$$F(i, \sigma) = \frac{R(i)^2}{R(i)^2 + \sigma^2} * R(i)$$

wherein (i) is index of spectrum component in Hadamard spectrum, R(i) is spectrum component of reconstructed pixels corresponding to index, σ is filtering parameter deriving from codec quantization parameter QP using following equation:

$$\sigma = 2^{(1+0.126*(QP-27))}$$

Figure 26:
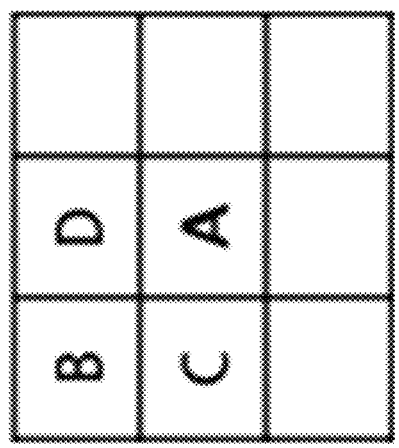
FIG. 26 shows an example scan pattern.

The example of scan pattern is depicted on FIG. 26. For pixels laying on CU boundary, the scan pattern is adjusted ensuring the required pixels are within current CU.

2.8 Clipping Functions

During the prediction stage (either intra or inter or combined intra-inter), reconstruction stage before in-loop filtering and during in-loop filtering, the predicted/reconstructed/filtered samples need to be clipped to a range.

Some clipping functions are defined in the standard, such as:

$$Clip1_Y(x) = Clip3(0, (1 << BitDepth_Y) - 1, x) \quad (1)$$

$$Clip1_C(x) = Clip3(0, (1 << BitDepth_C) - 1, x) \quad (2)$$

$$Clip3(x, y, z) = \begin{cases} x; & z < x \\ y; & z > y \\ z; & \text{otherwise} \end{cases} \quad (3)$$

In equation (3), y indicates the minimum value of the clipping parameter, and x indicates the maximum value of the clipping parameter.

Just to give some examples for the usage of clipping functions, some sub-clause(s) in the VVC specification (JVET-M1001 version 5) are listed herein.

2.8.1 Clipping in the Intra Prediction Stage 8.4.4.2.7 Specification of INTRA_ANGULAR2 . . . INTRA_ANGULAR66 Intra Prediction Modes Inputs to this process are:
the intra prediction mode predModeIntra,
a variable refIdx specifying the intra prediction reference line index,
a variable nTbW specifying the transform block width,
a variable nTbH specifying the transform block height,
a variable refW specifying the reference samples width,
a variable refH specifying the reference samples height,
a variable nCbW specifying the coding block width, a variable nCbH specifying the coding block height,
a variable cIdx specifying the colour component of the current block,
the neighbouring samples p[x][y], with x=−1−refIdx, y=−1−refIdx . . . refH−1 and x=−refIdx . . . refW−1, y=−1−refIdx.

Outputs of this process are the modified intra prediction mode predModeIntra and the predicted samples predSamples[x][y], with x=0 . . . nTbW−1, y=0 . . . nTbH−1.

. . .

The values of the prediction samples predSamples[x][y], with x=0 . . . nTbW−1, y=0 . . . nTbH−1 are derived as follows:

If predModeIntra is greater than or equal to 34, the following ordered steps apply:
1. The reference sample array ref[x] is specified as follows:
   The following applies:
   . . .
2. The values of the prediction samples predSamples[x][y], with x=0 . . . nTbW−1, y=0 . . . nTbH−1 are derived as follows:
   The index variable iIdx and the multiplication factor iFact are derived as follows:

$iIdx=((y+1+refIdx)*intraPredAngle)\!>\!>5+refIdx$ (8-137)

$iFact=((y+1+refIdx)*intraPredAngle)\&\ 31$ (8-138)

If cIdx is equal to 0, the following applies:
   The interpolation filter coefficients fT[j] with j=0 . . . 3 are derived as follows:

$fT[j]=filterFlag?fG[iFact][j]:fC[iFact][j]$ (8-139)

The value of the prediction samples predSamples[x][y] is derived as follows:

$predSamples[x][y]=Clip1Y(((\Sigma_{i=0}^{3}fT[i]*ref[x+iIdx+i])+32)\!>\!>6)$ (8-140)

Otherwise (cIdx is not equal to 0), depending on the value of iFact, the following applies:
   If iFact is not equal to 0, the value of the prediction samples predSamples[x][y] is derived as follows:

$predSamples[x][y]((32-iFact)*ref[x+iIdx+1]+iFact*ref[x+iIdx+2]+16)\!>\!>5$ (8-141)

Otherwise, the value of the prediction samples predSamples[x][y] is derived as follows:

$predSamples[x][y]=ref[x+iIdx+1]$ (8-142)

Otherwise (predModeIntra is less than 34), the following ordered steps apply:
1. The reference sample array ref[x] is specified as follows:
   The following applies:

$ref[x]=p[-1-refIdx][-1-refIdx+x]$, with $x=0$ . . . $n$TbH+refIdx (8-143)

If intraPredAngle is less than 0, the main reference sample array is extended as follows:
   When (nTbW*intraPredAngle)>>5 is less than −1, $ref[x]p[-1-refIdx+((x*invAngle+128)\!>\!>8)][-1-refIdx]$, with $x=-1$ . . . $(n$TbW*intraPredAngle$)\!>\!>5$ (8-144)

$ref[((n$TbW*intraPredAngle$)\!>\!>5)-1]=ref[(n$TbW*intraPredAngle$)\!>\!>5]$ (8-145)

$ref[n$TbG+1+refIdx$]=ref[n$TbH+refIdx$]$ (8-146)

Otherwise, $ref[x]=p[-1-refIdx][-1-refIdx+x]$, with $x=n$TbH+1+refIdx . . . refH+refIdx (8-147)

$ref[-1]=ref[0]$ (8-148)

The additional samples ref[refH+refIdx+x] with x=1 . . . (Max(1, nTbW/nTbH)*refIdx+1) are derived as follows:

$ref[refH+refIdx+x]=p[-1+refH][-1-refIdx]$ (8-149)

2. The values of the prediction samples predSamples[x][y], with x=0 . . . nTbW−1, y=0 . . . nTbH−1 are derived as follows:
   The index variable iIdx and the multiplication factor iFact are derived as follows:

$iIdx=((x+1+refIdx)*intraPredAngle)\!>\!>5$ (8-150)

$iFact=((x+1+refIdx)*intraPredAngle)\&\ 31$ (8-151)

If cIdx is equal to 0, the following applies:
   The interpolation filter coefficients fT[j] with j=0 . . . 3 are derived as follows:

$fT[j]=filterFlag?fG[iFact][j]:fC[iFact][j]$ (8-152)

The value of the prediction samples predSamples[x][y] is derived as follows:

$predSamples[x][y]=Clip1Y(((\Sigma_{i=0}^{3}fT[i]*ref[y+iIdx+i])+32)\!>\!>6)$ (8-153)

Otherwise (cIdx is not equal to 0), depending on the value of iFact, the following applies:
   If iFact is not equal to 0, the value of the prediction samples predSamples[x][y] is derived as follows:

$predSamples[x][y]((32-iFact)*ref[y+iIdx+1]+iFact*ref[y+iIdx+2]+16)\!>\!>5$ (8-154)

Otherwise, the value of the prediction samples predSamples[x][y] is derived as follows:

$predSamples[x][y]=ref[y+iIdx+1]$ (8-155)

3. Drawbacks of Existing Implementations

The current design of ILR may have the following problems:
1. Side information is copied from the one in the decoding order. Side information of ILR in BP slices could be inherited from I slices, predicted from non-reference pictures.
2. When there is no residual (such as coded block flag for the luma component is equal to 0, or root coded block flag is equal to 0 indicating all residual of three color components are zero), prediction signal is clipped in the motion compensation stage, and reconstruction stage is clipped again; then may apply forward LUT to convert to a second domain (reshaped domain). Twice clipping increases the complexity.
3. Any value to be padded during intra prediction (or IBC or other modes utilizing reconstructed information within same picture/slice/tile group/tile), should be in the second domain while it is in the original domain in ILR.
4. During the prediction stage (either intra or inter or combined intra-inter), reconstruction stage before in-loop filtering and during in-loop filtering, the predicted/reconstructed/filtered samples need to be clipped to a range. Fixed clipping parameters (i.e., minimum value equal to 0 and maximum value equal to (1<<BD)−1)

are utilized without consideration of the usage of ILR. Here, BD indicates the bit-depth.

4. Example Embodiments and Techniques

The detailed embodiments described below should be considered as examples to explain general concepts. These embodiments should not be interpreted narrowly way. Furthermore, these embodiments can be combined in any manner.

Signaling of ILR Side Information

1. Instead of directly inheriting the side information of ILR ((e.g., the look up table or parameters for the PWL model) from the previously decoded tile group (or picture, or slice or other video data units) with ILR, predictive coding of side information may be applied.
    a. In one example, the differences between a parameter for the PWL model associated with current video data unit (such as tile group, or picture, or slice or other video data units) and that associated with another video data unit may be coded instead.
    b. In one example, some parts of the piece-wise linear function may be inherited, and other parts may be signaled.
2. Instead of directly inheriting the side information of ILR ((e.g., the look up table or parameters for the PWL model) from the previously decoded tile group (or picture, or slice or other video data units) with ILR, multiple sets of side information (e.g. look up tables or parameters) for the PWL model may be utilized for coding the side information of current video data unit.
    a. Alternatively, furthermore, one or multiple indices to the multiple sets may be signaled.
        i. The signaled one or multiple sub-sets of side information of ILR may be used to derive the side information of ILR of the current tile group, or picture, or slice.
        ii. The one or multiple indices may be signaled in tile group header/slice header/picture header.
    b. The one or multiple sets of side information of ILR may be signaled in APS.
    c. Alternatively, furthermore, the multiple sets may be stored in a buffer with first-in-first-out according to the decoding order.
    d. Alternatively, furthermore, the parameters coded in the bitstream may be utilized to update the buffer while the parameters inherited from others may be disallowed to update the buffer (e.g., when tile_group_reshaper_model_present_flag is false)
    e. In one example, the side information of ILR for the current tile group (or picture, or slice) may be inherited from one of the multiple sets of the side information of ILR stored in the buffer.
        i. The index of the set of the side information of ILR to be inherited may be signaled.
    f. In one example, the side information of ILR for the current tile group (or picture, or slice) may be predicted from one or more of the multiple sets of the side information of ILR stored in the buffer.
        i. The index (indices) of the set(s) of the side information of ILR to be used as prediction may be signaled.
3. It is proposed to disable predicting and/or inheriting the side information of ILR (e.g., the look up table or parameters for the PWL model) from that associated with a picture which is not a reference picture for the current picture/slice/tile group/tile/video unit.
    a. Alternatively, furthermore, predicting and/or inheriting the side information (e.g., the look up table or parameters for the PWL model) is only allowed from that associated with a picture which is a reference picture for the current picture/slice/tile group/tile/video unit.
    b. Alternatively, furthermore, predicting and/or inheriting the side information (e.g., the look up table or parameters for the PWL model) is only allowed from that associated with a picture which is a reference picture for the current picture/slice/tile group/tile/video unit and the temporal layer index of the reference picture is no larger than that for the current picture/slice/tile group/tile/video unit.
    c. Alternatively, furthermore, predicting and/or inheriting the side information (e.g., the look up table or parameters for the PWL model) is only allowed from that associated with a picture which has smaller or equal temporal layer index of the current picture/slice/tile group/tile/video unit.
    d. Alternatively, furthermore, predicting and/or inheriting the side information (e.g., the look up table or parameters for the PWL model) is only allowed from that associated with a picture which is stored in the decoded picture buffer.
    e. In one example, one or more reference lists and/or reference indices associated with the reference pictures, from which side information of ILR (e.g., the look up table or parameters for the PWL model) of the current tile group (or picture, or slice) can be inherited and/or predicted, may be signaled.
        i. In one example, the signaling may be in tile group header/slice header/picture header.
        ii. In one example, an exemplary syntax table signaled in the tile group header/slice header/picture header is proposed as below reshaper_model_from_l1_flag is 1 if the reshaping information is inherited

```
if ( sps_reshaper_enabled_flag ) {
    tile_group_reshaper_model_present_flag                                    u(1)
        if ( tile_group_reshaper_model_present_flag )
        tile_group_reshaper_model ( )
        if ( tile_group_type != I ) {
            if( tile_group_type = = B)
        reshaper_model_from_l1_flag                                           u(1)
        reshaper_mode_from_refidx
    }
    tile_group_reshaper_enable_flag                                           u(1)
        if ( tile_group_reshaper_enable_flag && (!( qtbtt_dual_tree_intra_flag &&
tile_group_type == I ) ) )
        tile_group_reshaper_chroma_residual_scale_flag                        u(1)
}
``` from a reference picture in reference list 1. Otherwise, the reshaping information is inherited from a reference picture in reference list 0. When not present, it can be inferred to be 0. reshaper_mode_from_refidx indicates the reference index of the reference picture from which the reshaping information is inherited.
iii. In one example, if tile_group_reshaper_model_present_flag is equal to 0 and the current tile_group_type is I-tile_group (or I-slice), then the reshaping information of the current tile group or slice or picture is initialized.
  1. In one example, the initialization methods have been disclosed in detail in PCT/CN2019/077429, which is incorporated by reference herein.
iv. In one example, if the reshaping information is inherited from a reference picture, the reshaping information is inherited from the reshaping information of one tile group or slice of the reference picture. For example, the reshaping information is inherited from the reshaping information of the first tile group or slice of the reference picture.
v. In one example, when reshaping information (denoted as B) is inherited from the reshaping information (denoted as A) of one tile group or slice or picture, one or some or all of the following operations are conducted:
  1. reshaper_model_min_bin_idx in A is copied to B;
  2. reshaper_model_max_bin_idx in A is copied to B;
  3. RspCW[i] in A is copied to B;
     a. In one example, reshaper_model_min_bin_idx<=i<=reshaper_model_max_bin_idx.
     b. Alternatively, 0<=i<=MaxBinIdx.
  4. RspDeltaCW [i] in A is copied to B;
     a. In one example, reshaper_model_min_bin_idx<=i<=reshaper_model_max_bin_idx.
     b. Alternatively, 0<=i<=MaxBinIdx.
  5. ReshapePivot[i] in A is copied to B;
     a. In one example, reshaper_model_min_bin_idx<=i<=reshaper_model_max_bin_idx.
     b. Alternatively, 0<=i<=MaxBinIdx.
  6. ScaleCoef[i] in A is copied to B;
     a. In one example, reshaper_model_min_bin_idx<=i<=reshaper_model_max_bin_idx.
     b. Alternatively, 0<=i<=MaxBinIdx.
  7. InvScaleCoeff[i] in A is copied to B;
     a. In one example, reshaper_model_min_bin_idx<=i<=reshaper_model_max_bin_idx.
     b. Alternatively, 0<=i<=MaxBinIdx.
  8. ChromaScaleCoef[i] in A is copied to B;
     a. In one example, reshaper_model_min_bin_idx<=i<=reshaper_model_max_bin_idx.
     b. Alternatively, 0<=i<=MaxBinIdx.
  9. tile_group_reshaper_enable_flag in A is copied to B;
  10. tile_group_reshaper_chroma_residual_scale_flag in A is copied to B.

vi. In one example, the encoder or decoder may select the reference picture, from which reshaping information is inherited, following the rules as below:
  1. If the corresponding slice or tile group of one reference picture is I slice or I tile group, then this reference picture is selected.
  2. If the corresponding slices or tile groups of more than one reference pictures are I slices or I tile groups, then the reference picture closest to the current picture (e.g., the absolute difference of the POC of the reference picture and the current picture is the smallest) is selected;
  3. If there is no corresponding slice or tile group of any reference picture being a I slice or I tile group, then
     a. The reference picture with reference index=0 and reference list=0 is selected if there is no reference picture in reference list 1, such as for a P slice;
     b. The reference picture with reference index=0 and reference list=0 is selected if there is no I slice with POC larger than the current picture has been transmitted.
     c. Suppose the POC of the last transmitted I slice that has a POC larger than the current picture is denoted as POC_I1, the POC of the last transmitted I slice that has a POC smaller than the current picture is denoted as POC_I0, and POC of the current picture is POC_curr, then, the reference picture with reference index=0 and reference list=0 is selected if the |POC_I0-POC_curr|<=|POC_I1-POC_curr|; Otherwise, the reference picture with reference index=0 and reference list=1 is selected.
f. In one example, the reference pictures, from which the side information of ILR (e.g., the look up table or parameters for the PWL model) of the current tile group (or picture, or slice) can be inherited and/or predicted, may be predefined.
  i. In one example, the side information of ILR (e.g., the look up table or parameters for the PWL model) of the current tile group (or picture, or slice) is inherited and/or predicted from the collocated picture.
  ii. In one example, the side information of ILR (e.g., the look up table or parameters for the PWL model) of the current tile group (or picture, or slice) is inherited and/or predicted from the reference picture with reference index equal to IDX and reference list equal to LX. E.g. IDX=0 and LX=0.
  iii. In one example, the side information of ILR (e.g., the look up table or parameters for the PWL model) of the current tile group (or picture, or slice) is inherited and/or predicted from the reference picture which is closest to the current picture in the displaying order.
  iv. In one example, the side information of ILR (e.g., the look up table or parameters for the PWL model) of the current tile group (or picture, or slice) is inherited and/or predicted from the reference picture which is closest to the current picture in the decoding order.
4. It is proposed to signal side information of ILR (e.g., the look up table or parameters for the PWL model, whether ILR is enabled or disabled) at the tile level/

CTU level/region level which may contain multiple coded blocks instead of at the tile group level.
  a. In one example, when one picture/tile group contains multiple tiles, predicting and/or inheriting the side information (e.g., the look up table or parameters for the PWL model) of one tile from another tile may be allowed.
  b. Alternatively, when one picture/tile group contains multiple tiles, predicting and/or inheriting the side information (e.g., the look up table or parameters for the PWL model) of one tile from another tile may be disallowed.
  c. Alternatively, side information of ILR may be signaled in tile group header, and all tiles within this tile group share the same side information.
5. In one example, two-level signaling of ILR may be applied, wherein for the first-level, the side information is signaled and for the second-level, predicting/inheriting from the first-level signaled results may be utilized.
  a. In one example, the first-level is the tile group level and the second-level is the tile level.
  b. In one example, the first-level is the picture level and the second-level is the tile group level.
  c. In one example, the first-level is the Adaptation Parameter Set (APS) level and the second-level is the picture level or tile group level or tile level.

Handling Unavailable Samples

6. When one block is predicted from samples (either predicted samples and/or reconstructed samples) in the same tile/tile group/picture, the unavailable samples may be derived from the look up table or the PWL model used in ILR.
  a. In one example, for the intra coded block, when a neighboring reconstructed sample is unavailable, it may be set to default value, such as forwardLUT(x) wherein x is the default value used when ILR is disabled. The function forwardLUT(x) returns the corresponding value of x in the reshaped domain.
    i. In one example, for the intra DC mode, when a neighboring reconstructed sample is unavailable, it may be set to forwardLUT(1<<(Bitdepth−1)) instead of (1<<(Bitdepth−1)).
    ii. In one example, for the cross-component linear model (CCLM) modes (e.g. LM/LM-A/LM-L mode), when no valid linear parameters can be derived, the default prediction value is set to be forwardLUT(1<<(Bitdepth−1)).
7. Clipping parameters defined in the original domain may be derived from the inverse look up table (or the PWL model).
  a. In one example, the minimum value in the clipping function is defined to be InverseLUT(x). e.g. x=0.
  b. In one example, the maximum value in the clipping function is defined to be InverseLUT(y) wherein y is unequal to 0. For example, y is the largest entry index, such as ((1<<BD)−1) wherein BD is the bit-depth for the input or output reconstructed samples.
8. Clipping parameters defined in the reshaped domain may be derived from the inverse look up table (or the PWL model).
  a. In one example, the minimum value in the clipping function is defined to be a default value (such as 0).
  b. In one example, the minimum value in the clipping function is defined to be InverseLUT(y). For example, y is the largest value that result in InverseLUT(y) is unequal to InverseLUT(y+1).
    i. In one example, y is the in the range of [0, maximum entry index].
    ii. In one example, y is in the range of [0, (1<<(BD−1))] wherein BD is the bit-depth for the input or output reconstructed samples.
9. Clipping parameters derived for the reshaped domain and/or original domain according to the ILR information (such as methods mentioned in items 7 and 8) may be utilized in the encoding/decoding process.
  a. In one example, they may be utilized in the clipping process during intra and/or intra block copy prediction block generation process.
  b. In one example, they may be utilized in the clipping process during palette mode.
  c. Alternatively, they may be utilized in the clipping process during motion compensation process.
  d. Alternatively, they may be utilized in the clipping process during inter prediction block generation process (such as weighted prediction, illumination compensation prediction block generation process, inter-intra prediction, general-Bi prediction, BIO (a/k/a BDOF)).
  e. Alternatively, they may be utilized in the clipping process during final reconstruction block derivation process.
  f. Alternatively, they may be utilized in the clipping process during filtering process (such as post-reconstruction process, in-loop filtering process like deblocking/SAO/ALF).
  g. Different stages mentioned above (such as intra/inter prediction block generation process) may select either using clipping parameters in the original/reshaped domain.
10. Clipping parameters (e.g., maximum and minimum values) may be defined differently before or during the in-loop filtering process (such as deblocking filter, sample adaptive offset, adaptive loop filter).
  a. In one example, clipping parameters may be defined in the reshaped domain before the in-loop filtering process.
  b. In one example, clipping parameters utilized in the prediction and/or reconstruction block derivation process may be defined in the reshaped domain.
    i. Alternatively, furthermore, such a prediction/reconstruction block is according to one coded mode which relies on reconstructed/predicted samples of a block in current tile/tile group/slice/picture, such as intra mode, intra block copy mode, palette mode.
    ii. Alternatively, when a prediction block is according to one coded mode which relies on reconstructed/predicted samples of a block in different tile/tile group/slice/picture, such as inter mode, the utilized clipping parameters may be defined in the original domain.
    iii. Alternatively, when a reconstructed block is derived from multiple prediction blocks which rely on reconstructed/predicted samples of a block in the same and different tile/tile group/slice/picture, such as combined intra-inter mode, the utilized clipping parameters may be defined in the original domain for the prediction block derived from the inter mode, and in the reshaped domain for the prediction block derived from the intra mode, and in the reshaped domain for the reconstructed block.
- c. In one example, clipping parameters may be defined in the original domain during the in-loop filtering process.
11. Clipping parameters derived for the reshaped domain and/or original domain according to the ILR information (such as methods mentioned in items 7 and 8) and fixed clipping parameters as in current design may be utilized in the encoding/decoding process.
  - a. In one example, when the ILR is disabled for the current video data unit (such as slice/tile group/tile/picture), the fixed clipping parameters may be utilized.
  - b. In one example, when the ILR is enabled for the current video data unit (such as slice/tile group/tile/picture), the clipping parameters derived for the reshaped domain and/or original domain may be utilized.
  - c. Alternatively, clipping parameters derived for the reshaped domain and/or original domain according to the ILR information (such as methods mentioned in items 7 and 8), adaptive clipping parameters (such as derived from decoded bitstream) and/or fixed clipping parameters may be utilized in the encoding/decoding process.
    - i. In one example, when the ILR is disabled for the current video data unit (such as slice/tile group/tile/picture) and adaptive clipping is enabled, the adaptive clipping parameters may be utilized.
    - ii. In one example, when the ILR is enabled for the current video data unit (such as slice/tile group/tile/picture), the clipping parameters derived for the reshaped domain and/or original domain may be utilized.
    - iii. In one example, when the ILR and adaptive clipping are disabled for the current video data unit (such as slice/tile group/tile/picture), the fixed clipping parameters.
    - iv. Alternatively, adaptive clipping parameters may be conditionally signaled.
      1. In one example, according to the usage of ILR. When ILR is enabled, signaling of adaptive clipping parameters may be skipped and adaptive clipping is inferred to be false.
  - d. All the items may be applicable to a certain stage during the encoding/decoding process.
12. The above methods may be applied under certain conditions.
  - a. In one example, the condition may be defined as the ILR is enabled for the current tile/tile group/picture/sequence.
  - b. In one example, the condition may be defined as the color component is the luma color component or the main color component (such as the G color component for GBR input sequences).
13. It is proposed to treat chroma components in a similar way as the luma component, i.e., being reshaped according to look up tables/PWL models, instead of using luma-based residual scaling.
  - a. In one example, whether to apply luma-based residual scaling may depend on whether the color format is 4:4:4.
  - b. In one example, when the color format is 4:4:4, the luma-based residual scaling is replaced by signaled or derived look up tables/PWL models.
  - c. In one example, two chroma components may share the same reshaping side information (i.e., look up tables/PWL models and/or enabling/disabling flag).
  - d. In one example, when the color format is 4:4:4, the look up tables/PWL models for the chroma components may be derived from that for the luma component.
  - e. In one example, when the color format is 4:4:4, the look up tables/PWL models for the chroma components may be signaled in APS/PPS/picture header/slice header/tile group header/tile/other video units.
  - f. In one example, when the color format is 4:4:4, the look up tables/PWL models for the chroma components may be predictively coded in APS/PPS/picture header/slice header/tile group header/tile/other video units.
    - i. In one example, the look up tables/PWL models of one color component may be predicted from that of another color component.
  - g. In one example, when the color format is 4:4:4, the look up tables/PWL models for the one color components may be derived from that used by another color component.
    - i. In one example, the look up tables/PWL models of one chroma component may be predicted from that of the luma component and/or another chroma component.
  - h. When reshaping is disallowed for the luma component, reshaping for chroma component is directly disabled.
    - i. Alternatively, furthermore, there is no need to signal the side information for the chroma components.
14. The methods disclosed in this document can be combined with methods disclosed in PCT/CN2019/077429, which is incorporated by reference herein.

5. Some Example Embodiments

In this section, some example embodiments are described with reference to a bitstream syntax that shows how the bitstream syntax of the current version of VVC can be modified based on some techniques described in the present document. Various syntax element in the description below have meanings similar to meanings described in the VVC document. Furthermore, where applicable, new syntax elements and their descriptions are highlighted using bold face italicized text.

Syntax design in one embodiment is shown as below. General tile group header syntax

| | Descriptor |
|---|---|
| tile_group_header( ) { | |
|   tile_group_pic_parameter_set_id | ue(v) |
|   if( NumTilesInPic > 1 ) { | |

|  | Descriptor |
|---|---|
|     tile_group_address | u(v) |
|     num_tiles_in_tile_group_minus1 | ue(v) |
| } | |
| tile_group_type | ue(v) |
| tile_group_pic_order_cnt_lsb | u(v) |
| if( partition_constraints_override_enabled_flag ) { | |
|   partition_constraints_override_flag | ue(v) |
|   if( partition_constraints_override_flag ) { | |
|     tile_group_log2_diff_min_qt_min_cb_luma | ue(v) |
|     tile_group_max_mtt_hierarchy_depth_luma | ue(v) |
|     if( tile_group_max_mtt_hierarchy_depth_luma != 0) | |
|       tile_group_log2_diff_max_bt_min_qt_luma | ue(v) |
|       tile_group_log2_diff_max_tt_min_qt_luma | ue(v) |
|     } | |
|     if( tile_group_type == I && qtbtt_dual_tree_intra_flag ) { | |
|       tile_group_log2_diff_min_qt_min_cb_chroma | ue(v) |
|       tile_group_max_mtt_hierarchy_depth_chroma | ue(v) |
|       if( tile_group_max_mtt_hierarchy_depth_chroma != 0) | |
|         tile_group_log2_diff_max_bt_min_qt_chroma | ue(v) |
|         tile_group_log2_diff_max_tt_min_qt_chroma | ue(v) |
|       } | |
|     } | |
|   } | |
| } | |
| if ( tile_group_type != I) { | |
|   if( sps_temporal_mvp_enabled_flag ) | |
|     tile_group_temporal_mvp_enabled_flag | u(1) |
|   if( tile_group_type == B ) | |
|     mvd_l1_zero_flag | u(1) |
|   if( tile_group_temporal_mvp_enabled_flag ) { | |
|     if( tile_group_type == B) | |
|       collocated_from_l0_flag | u(1) |
|   } | |
|   six_minus_max_num_merge_cand | ue(v) |
|   if( sps_affine_enable_flag ) | |
|     five_minus_max_num_subblock_merge_cand | ue(v) |
| } | |
| tile_group_qp_delta | se(v) |
| if( pps_tile_group_chroma_qp_offsets_present_flag ) { | |
|   tile_group_cb_qp_offset | se(v) |
|   tile_group_cr_qp_offset | se(v) |
| } | |
| if( sps_sao_enabled_flag ) { | |
|   tile_group_sao_luma_flag | u(1) |
|   if( ChromaArrayType != 0) | |
|     tile_group_sao_chroma_flag | u(1) |
| } | |
| if( sps_alf_enabled_flag ) { | |
|   tile_group_alf_enabled_flag | u(1) |
|   if( tile_group_alf_enabled_flag ) | |
|     alf_data( ) | |
| } | |
| if( tile_group_type == P \|\| tile_group_type == B) { | |
|   num_ref_idx_l0_active_minus1 | ue(v) |
|   if( tile_group_type == B) | |
|   num_ref_idx_l1_active_minus1 | ue(v) |
| } | |
| dep_quant_enabled_flag | u(1) |
| if( !dep_quant_enabled_flag ) | |
|   sign_data_hiding_enabled_flag | u(1) |
| if( deblocking_filter_override_enabled_flag ) | |
|   deblocking_filter_override_flag | u(1) |
| if( deblocking_filter_override_flag ) { | |
|   tile_group_deblocking_filter_disabled_flag | u(1) |
|   if( !tile_group_deblocking_filter_disabled_flag ) { | |
|     tile_group_beta_offset_div2 | se(v) |
|     tile_group_tc_offset_div2 | se(v) |
|   } | |
| } | |
| if( num_tiles_in_tile_group_minus1 > 0) { | |
|   offset_len_minus1 | ue(v) |
|   for( i = 0; i < num_tiles_in_tile_group_minus1; i++ ) | |
|     entry_point_offset_minus1[ i ] | u(v) |
| } | |
| *if ( sps_reshaper_enabled_flag ) {* | |
|   *tile_group_reshaper_model_present_flag* | *u(1)* |
|   *if ( tile_group_reshaper_model_present_flag )* | |

|  | Descriptor |
|---|---|
|     tile_group_reshaper_model ( ) | |
|     else if ( tile_group_type != I ) { | |
|   if( tile_group_type = = B ) | |
|     reshaper_model_from_l1_flag | u(1) |
|     reshapter_mode_from_refidx | ue(v) |
|   } | |
|   tile_group_reshaper_enable_flag | u(1) |
|   if ( tile_group_reshaper_enable_flag && (!( qtbtt_dual_tree_intra_flag && tile_group_type == I ) ) ) | |
|     tile_group_reshaper_chroma_residual_scale_flag | u(1) |
|   } | |
|   byte_alignment( ) | |
| } | |

Add a New Syntax Table Tile Group Reshaper Model:

| tile_group_reshaper_model ( ) { | Descriptor |
|---|---|
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i++ ) { | |
|     reshape_model_bin_delta_abs_CW[ i ] | u(v) |
|     if ( reshaper_model_bin_delta_abs_CW[ i ] ) > 0 ) | |
|       reshaper_model_bin_delta_sign_CW_flag[ i ] | u(1) |
|   } | |
| } | |

In General sequence parameter set RBSP semantics, add the following semantics:

sps_reshaper_enabled_flag equal to 1 specifies that reshaper is used in the coded video sequence (CVS). sps_reshaper_enabled_flag equal to 0 specifies that reshaper is not used in the CVS.

In tile group header syntax, add the following semantics
tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.

*reshaper_model_from_l1_flag is 1 if the reshaping information is inherited from a reference picture in reference list 1. Otherwise, the reshaping information is inherited from a reference reshaper_model_from. reshaper_model_from. reshaper_model_from. reshaper_model_from. picture in reference list 0. The When not present, it should be inferred to be 0. If reshaper_model_ from_l1_flag is not present, it is inferred to be 0.*

*reshapter_mode_ from_refidx indicates the reference index of the reference picture from which the reshaping information is inherited. If reshapter_mode_ from_refidx is not present, it is inferred to be 0.* tile_group_reshaper_enabled_flag equal to 1 specifies that reshaper is enabled for the current tile group. tile_group_reshaper_enabled_flag equal to 0 specifies that reshaper is not enabled for the current tile group. When tile_group_reshaper_enable_flag is not present, it is inferred to be equal to 0.

tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.

Add tile_group_reshaper_model( ) syntax
reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.

reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx−reshape_model_delta_max_bin_idx.

*In a conforming bit-stream, reshape _model_delta_max_ bin_idx should be in the range from 0 to MaxBinIdx-reshape _model_min_bin_idx.* reshaper_model_bin_delta_abs_cw_prec_minus1 plus 1 specifies the number of bits used for the representation of the syntax reshape_model_bin_delta_abs_CW[i].

*In a conforming bit-stream, reshaper_model_bin_ delta_abs_cw_prec_ minus1 must no larger than 6.* reshape_model_bin_delta_abs_CW[i] specifies the absolute delta codeword value for the ith bin.

reshaper_model_bin_delta_sign_CW_flag[i] specifies the sign of reshape_model_bin_delta_abs_CW[i] as follows:

If reshape_model_bin_delta_sign_CW_flag[i] is equal to 0, the corresponding variable RspDeltaCW[i] is a positive value.

Otherwise (reshape_model_bin_delta_sign_CW_flag[i] is not equal to 0), the corresponding variable RspDeltaCW[i] is a negative value.

When reshape_model_bin_delta_sign_CW_flag[i] is not present, it is inferred to be equal to 0.

The variable RspDeltaCW[i]=(1 2*reshape_model_bin_delta_sign_CW [i])*reshape_model_bin_delta_abs_CW[i];

The variable RspCW[i] is derived as following steps:

The variable OrgCW is set equal to $(1<<BitDepth_Y)/$(MaxBinIdx+1).

If reshaper_model_min_bin_idx<=i<=reshaper_model_max_bin_idx RspCW[i]=OrgCW+RspDeltaCW[i].

Otherwise, RspCW[i]=0.

The value of RspCW [i] shall be in the range of 32 to 2*OrgCW−1 if the value of $BitDepth_Y$ is equal to 10.

The variables InputPivot[i] with i in the range of 0 to MaxBinIdx+1, inclusive are derived as follows InputPivot[i]=i*OrgCW

*If tile_group _reshaper_model_ present_flag is equal to 0 and the current tile_ group_type is I-tile_group, then the reshaping information of the current tile group is initialized as below:*
*RspCW[ i ]=0, for i = 0, 1, . . . , MaxBinIdx.*

*If reshaper_mode _from_refidx is present, let refTileGroup be the first tile group of the reference picture with reference index reshaper_mode_from_refidx, in the reference list (reshaper_model_from_ l1_flag? 1 : 0).*
*Then the following applies:*
*RspCW[ i ] are set equal to RspCW[ i ] of refTileGroup for i = 0, 1, . . . , MaxBinIdx,*
reshape_model_min _bin_idx is set equal to reshape_model_min_bin_idx of refTileGroup. reshape_model_ max_bin_idx is set equal to reshape _model_max_bin_ idx of refTileGroup.

The variable ReshapePivot[i] with i in the range of 0 to MaxBinIdx+1, inclusive, the variable ScaleCoef[i] and InvScaleCoeff[i] with i in the range of 0 to MaxBinIdx, inclusive, are derived as follows:

```
shiftY = 14
ReshapePivot[ 0 ] = 0;
for( i = 0; i <= MaxBinIdx ; i++) {
  if RspCW[ i ] == 0
    ScaleCoef[ i ] = InvScaleCoeff[ i ]= 1 << shiftY,
  else
      ReshapePivot[ i + 1 ] = ReshapePivot[ i ] +  RspCW[ i ]
      ScaleCoef[ i ] =  ( RspCW[ i ] * (1 << shiftY) + (1 +21<
(Log2(OrgCW) − 1))) >> (Log2(OrgCW))
      if ( RspCW[ i ] == 0 )
         InvScaleCoeff[ i ] = 0
      else
         InvScaleCoeff[ i ] = OrgCW * (1 << shiftY) / RspCW[ i ]
}
```

The variable ChromaScaleCoef[i] with i in the range of 0 to MaxBinIdx, inclusive, are derived as follows:
ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};
shiftC=11 if (RspCW[ i]==0)
  ChromaScaleCoef[i]=(1<<shiftC)
Otherwise (RspCW[i] !=0),
  ChromaScaleCoef[i]=ChromaResidualScaleLut [RspCW[i]>>1]

6. Example Implementations of the Disclosed Technology

Figure 27A:
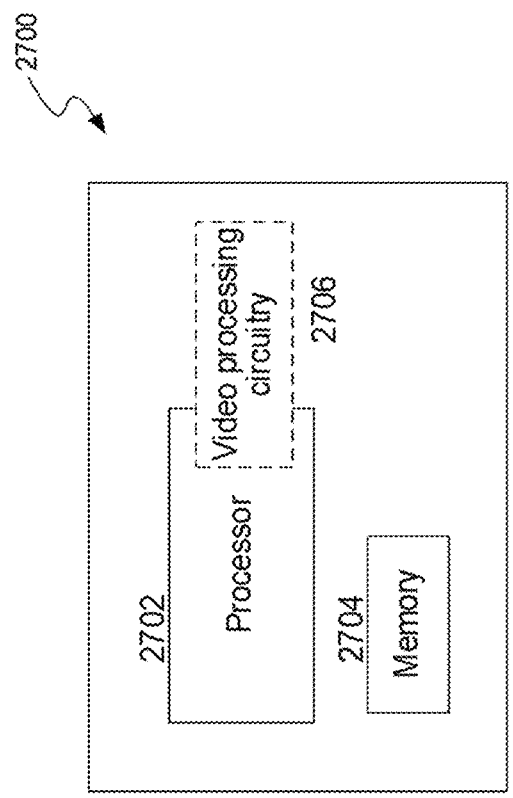
FIGS. 27A and 27B are block diagrams of examples of a hardware platform for implementing a visual media processing described in the present document.

FIG. 27A is a block diagram of a video processing apparatus 2700. The apparatus 2700 may be used to implement one or more of the methods described herein. The apparatus 2700 may be embodied in a smartphone, tablet, computer, Internet of Things (IoT) receiver, and so on. The apparatus 2700 may include one or more processors 2702, one or more memories 2704 and video processing hardware 2706. The processor(s) 2702 may be configured to implement one or more methods described in the present document. The memory (memories) 2704 may be used for storing data and code used for implementing the methods and techniques described herein. The video processing hardware 2706 may be used to implement, in hardware circuitry, some techniques described in the present document, and may be partly or completely be a part of the processors 2702 (e.g., graphics processor core GPU or other signal processing circuitry).

Figure 27B:
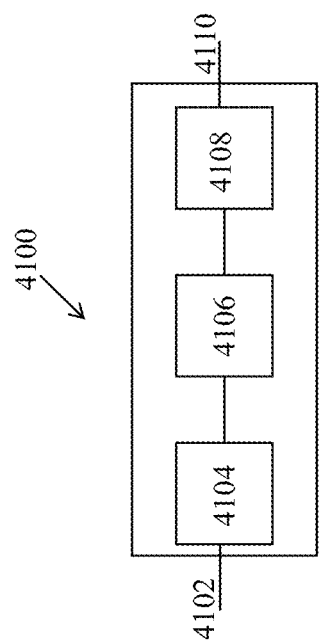

FIG. 27B is another example of a block diagram of a video processing system in which disclosed techniques may be implemented. FIG. 27B is a block diagram showing an example video processing system 4100 in which various techniques disclosed herein may be implemented. Various implementations may include some or all of the components of the system 4100. The system 4100 may include input 4102 for receiving video content. The video content may be received in a raw or uncompressed format, e.g., 8 or 10 bit multi-component pixel values, or may be in a compressed or encoded format. The input 4102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4100 may include a coding component 4104 that may implement the various coding or encoding methods described in the present document. The coding component 4104 may reduce the average bitrate of video from the input 4102 to the output of the coding component 4104 to produce a coded representation of the video. The coding techniques are therefore sometimes called video compression or video transcoding techniques. The output of the coding component 4104 may be either stored, or transmitted via a communication connected, as represented by the component 4106. The stored or communicated bitstream (or coded) representation of the video received at the input 4102 may be used by the component 4108 for generating pixel values or displayable video that is sent to a display interface 4110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 28A:
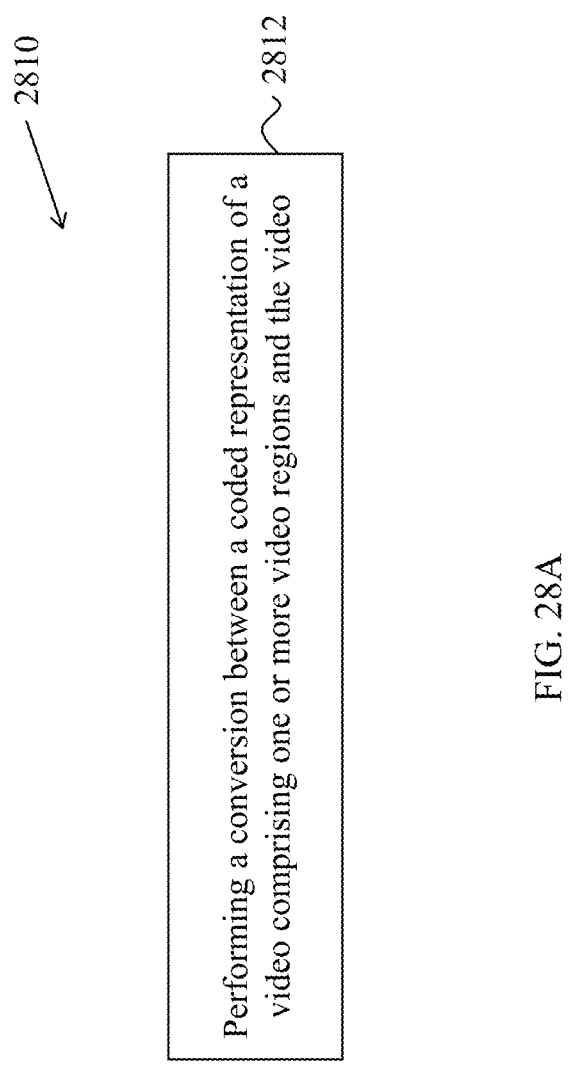
FIGS. 28A to 28C show flowcharts of example methods for video processing based on some implementations of the disclosed technology.

FIG. 28A is a flowchart for an example method 2810 of video processing. The method 2800 includes, at 2810, performing a conversion between a coded representation of a video comprising one or more video regions and the video. In some implementations, the coded representation includes side information or in-loop reshaping information applicable for in-loop reshaping (ILR) of some of the one or more video regions. In some implementations, the side information or the in-loop reshaping information provides parameters for a reconstruction of a video unit of a video region based on a representation of the video unit in a first domain and a second domain and/or scaling chroma residue of a chroma video unit.

In some implementations, the side information applicable to the some of the one or more video regions is coded without directly inheriting from other video regions. In some implementations, the coded representation includes the side information at a video region level that includes a current video block. In some implementations, a clipping process is used for the conversion based on clipping parameters that are in the first domain and/or in the second domain according to the ILR information. In some implementations, the coded representation includes information applicable for in-loop reshaping that provides ILR parameters including clipping parameters used according to a rule for a clipping process during the ILR. In some implementations, the conversion is performed between a current video block of the video that is a chroma block and the coded representation of the video. In some implementations, the conversion further includes applying a reshaping process to one or more chroma components of the current video block based on the side information. In some implementations, the side information for a current video region is determined according to a rule that disallows inheritance or prediction of the side information based on a temporal layer index of the current video region. In some implementations, the side information for a current video region is determined according to a rule that disallows inheritance or prediction of the side information from a first type of another picture.

In some implementations, the conversion is performed between a current video block of the video and the coded representation of the video using an in loop reshaping process. In some implementations, the in loop reshaping includes obtaining a prediction block from motion compensation prediction or an intra prediction; applying a forward reshaping to the prediction block to generate a forward reshaped prediction block in a first domain; reconstructing, based on the forward reshaped prediction block, the coded representation of the video to generate a first reconstruction block in a second domain; applying an inverse reshaping to the first reconstruction block to obtain an inverse reconstruction block; and applying a loop filter to the inverse reconstruction block to obtain a final reconstruction block. In some implementations, a single clipping process is used during the in loop reshaping process.

In some implementations, the coded representation includes a first side information at a first level, wherein a second side information at a second level is derived from the first side information such that the second side information provides parameters for a video unit coded with in-loop reshaping (ILR) in which a reconstruction of the video unit of a video region is based on a representation of a video unit in a first domain and a second domain and/or scaling chroma residue of a chroma video unit.

Figure 28B:
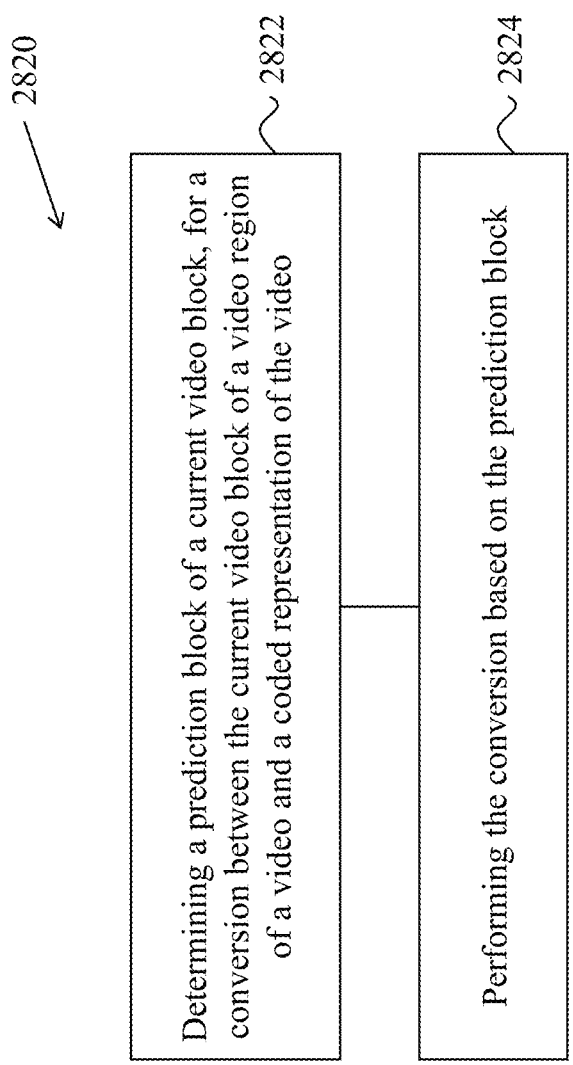

FIG. 28B is a flowchart for an example method 2820 of video processing. The method 2820 includes, at 2822, determining a prediction block of a current video block, for a conversion between the current video block of a video region of a video and a coded representation of the video. In some implementations, unavailable samples of the samples from the video region are determined based on a derivation rule that specifies to use an in-loop reshaping (ILR) information associated with the current video block. The method 2820 further includes, at 2824, performing the conversion based on the prediction block.

Figure 28C:
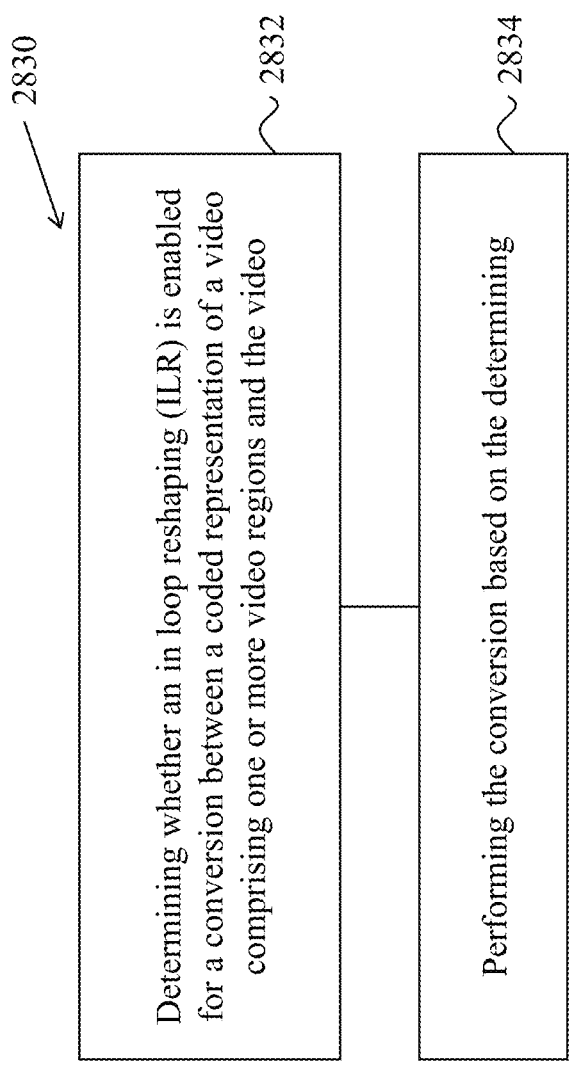

FIG. 28C is a flowchart for an example method 2840 of video processing. The method 2830 includes, at 2832, determining whether an in loop reshaping (ILR) is enabled for a conversion between a coded representation of a video comprising one or more video regions and the video. The method 2830 further includes, at 2834, performing the conversion based on the determining. In some implementations, a clipping process is used for the conversion based on ILR clipping parameters derived according to information associated with the ILR and/or fixed clipping parameters unrelated to the information associated with the ILR, and the information associated with the ILR is applicable for a reconstruction of a video unit of a video region based on a representation of the video unit in a first domain and a second domain and/or scaling chroma residue of a chroma video unit.

Various techniques and embodiments may be described using the following clause-based format.

The first set of clauses describe certain features and aspects of the disclosed techniques listed in the previous section.

1. A method of visual media processing, comprising:
   performing a conversion between a current video block and a bitstream representation of the current video block, wherein, during conversion, an in-loop reshaping step is used to transform a representation of the current video block from a first domain to a second domain according to side information associated with the in-loop reshaping step.

2. The method of clause 1, wherein the side information associated with the in-loop reshaping step includes one or more lookup tables or parameters for piece-wise linear models related to chroma samples or luma samples.

3. The method of clause 2, wherein differences between the current video block and another video block are predictively coded in the side information, wherein the differences are related to at least one parameter in the parameters for piece-wise linear models.

4. The method of clause 2, wherein indices of the side information are signaled in the bitstream information.

5. The method of clause 2, wherein the side information are subsets of the in-loop reshaping step.

6. The method of clause 2, wherein the indices of the side information are included in a tile group header, slice header, or picture header.

7. The method of any one or more of clauses 1-6, wherein the side information is predicted from information stored in a first-in-first-out buffer.

8. The method of clause 7, wherein the buffer is updated based on the parameters for piece-wise linear models in connection with the current video block.

9. The method of clause 7, wherein the buffer stores the side information for a first video block, further comprising:
predicting side information for a second video block based on the side information for the first video block.

10. The method of clause 7, wherein the buffer stores the side information for a first video block, further comprising:
inheriting side information for a second video block based on the side information for the first video block.

11. A method of visual media processing, comprising:
performing a conversion between a current video block and a bitstream representation of the current video block, wherein, during conversion, an in-loop reshaping step is used to transform a representation of the current video block from a first domain to a second domain according to side information associated with the in-loop reshaping step, and wherein inheritance or prediction of the side information of the current video block from the side information of another video block is selectively performed in a manner such that:
(i) if the another video block is a reference picture, the inheritance or the prediction is enabled and
(ii) if the another video block is a non-reference picture, the inheritance or the prediction is disabled.

12. The method of clause 11, wherein the inheritance or the prediction is enabled when a temporal layer index of the reference picture is no larger than a temporal index layer for the current video block.

13. The method of clause 14, wherein the reference picture is stored in a decoded picture buffer.

14. The method of clause 11, wherein the inheritance or the prediction is based on a list or an index.

15. The method of clauses 11-14, wherein the reference picture is predefined.

16. The method of clauses 15, wherein the reference picture is a collocated picture.

17. The method of clause 14, wherein the list is denoted as LX and the index is denoted as IDX, and wherein LX=0 and IDX=0.

18. The method of any one or more of clauses 15-16, wherein the reference picture is closest in decoding order to the current video block.

19. The method of clause 11, wherein the another video block is in a decoded picture buffer.

20. A method of visual media processing, comprising:
performing a conversion between a current video block and a bitstream representation of the current video block, wherein, during conversion, an in-loop reshaping step is used to transform a representation of the current video block from a first domain to a second domain according to side information associated with the in-loop reshaping step, and wherein inheritance or prediction of the side information of the current video block in a second tile from the side information of another video block in a first tile is selectively performed.

21. The method of 20, wherein the side information is included in a header associated with a group of tiles, and wherein the header is accessible by the first tile and the second tile.

22. The method of clause 20, wherein the first tile is a group of tiles and the second tile is a singular tile.

23. The method of clause 20, wherein the first tile is a picture and the second tile is a group of tiles.

24. The method of clause 20, wherein the first tile is an adaptation parameter set (APS) and the second tile is a group of tiles.

25. The method of clause 20, wherein the first tile is an adaptation parameter set (APS) and the second tile is a picture.

26. The method of clause 20, wherein the first tile is an adaptation parameter set (APS) and the second tile is a singular tile.

27. A method of visual media processing, comprising:
performing a conversion between a current video block and a bitstream representation of the current video block, wherein, during conversion, an in-loop reshaping step is used to transform a representation of the current video block from a first domain to a second domain according to side information associated with the in-loop reshaping step; and
upon detecting that sample information is unavailable for prediction of the current video block, constructing the current video block based on the side information associated with the in-loop reshaping step.

28. The method of clause 27, wherein the side information is set to a default value.

29. The method of clause 27, wherein the default value is set as forwardLUT(x), wherein forwardLUT(.) is a lookuptable and x is a value used when the in-loop reshaping step is disabled.

30. The method of clause 29, wherein the value x is set as $(1<<(Bitdepth-1))$, wherein Bitdepth is an input bitdepth value of the current video block or a video block reconstructed from the current video block.

31. A method of visual media processing, comprising:
performing a conversion between a current video block and a bitstream representation of the current video block, wherein, during conversion, an in-loop reshaping step is used to transform a representation of the current video block from a first domain to a second domain according to side information associated with the in-loop reshaping step; and
in response to detecting that the in-loop reshaping step is enabled for the current video block, decoding the current video block based on clipping parameters expressed in the first domain or the second domain, wherein the clipping parameters are computed according to an inverse lookup table inverseLUT(x) associated with the side information.

32. The method of clause 31, wherein a minimum value of the clipping parameters is defined when x=0.

33. The method of clause 31, wherein a maximum value of the clipping parameters is defined when $x=(1<<(Bitdepth-1))$, wherein Bitdepth is an input bitdepth value of the current video block or a video block reconstructed from the current video block.

34. The method of clause 31, wherein a minimum value of the parameters is 0.

35. The method of clause 31, wherein a minimum value of the parameters is defined as inverseLUT(x), wherein x is the largest value obtained by solving InverseLUT(x) unequal to InverseLUT(x−1).

36. The method of clause 35, wherein x lies in a range [0, maximum entry index].

37. The method of clause 35, wherein x lies in a range [0, (1<<(Bitdepth−1))], wherein Bitdepth is an input bitdepth value of the current video block or a video block reconstructed from the current video block.

38. The method of clause 31, wherein the parameters are used in at least a portion of one or more of the following steps: intra and/or intra block copy prediction block generation, palette mode, motion compensation, inter prediction block generation, final reconstruction block derivation, filtering.

39. The method of any one or more of clauses 31-38, further comprising:
 in response to detecting that the in-loop reshaping step is disabled and adaptive clipping is disabled, decoding the current video block based on predetermined clipping parameters.

40. The method of any one or more of clauses 31-38, further comprising:
 in response to detecting that the in-loop reshaping step is disabled and adaptive clipping is enabled, decoding the current video block based on clipping parameters signaled in the bitstream representation.

41. The method of any one or more of clauses 1-40, further comprising:
 detecting a condition associated with the current video block.

42. The method of clause 41, wherein the condition is related to any one or more of: a luma color component, a main color component, a color format, or a chroma component.

43. The method of clause 31, further comprising:
 upon detecting that neighboring sample information is unavailable for prediction of the current video block, constructing the current video block based on the side information associated with the in-loop reshaping step.

44. The method of any one or more of clauses 1-43, wherein the side information is included in a tile group header, a slice header, or a picture header.

45. A method of visual media processing, comprising:
 performing a conversion between a current video block and a bitstream representation of the current video block, wherein, during conversion, an in-loop reshaping step is used to transform a representation of the current video block from a first domain to a second domain according to side information associated with the in-loop reshaping step, and wherein inheritance or prediction of the side information of the current video block from the side information of another video block is selectively performed in a manner such that:
  (i) if the another video block is a reference picture, the inheritance or the prediction is enabled and
  (ii) if the another video block is a non-reference picture, the inheritance or the prediction is disabled,
 wherein the side information is included in a tile group header, a slice header, or a picture header, and wherein the reference picture is associated with one or more reference lists.

46. The method of clause 45, wherein the reference picture is associated with a first reference list in the one or more reference lists, and wherein the side information includes a flag with a value one.

47. The method of clause 46, wherein the first reference list is denoted as reference list 0.

48. The method of clause 46, wherein the first reference list is denoted as reference list 1.

49. The method of clause 45, wherein, if the another video block is the non-reference picture, the inheritance or the prediction is disabled, then the side information includes a flag with a value zero.

50. The method of clause 45, wherein, if (a) a flag denoted tile_group_reshaper_model_present_flag and present in the tile group header, the slice header, or the picture header equals 0, and (b) the tile group header, the slice header, or the picture header is of I-type, then the side information is initialized in accordance with an initialization step.

51. The method of clause 45, wherein, if the another video block is a reference picture, the inheritance or the prediction is enabled from the side information of a first tile group or a first slice of the reference picture.

52. The method of clause 51, wherein the side information of the another video block is a first side information, the side information of the current video block is a second side information, and wherein the second side information is inherited from the first side information.

53. The method of clause 52, wherein the second side information inheriting from the first side information includes copying from the first side information one or more of the following quantitates into associated one or more quantities in the second side information: reshaper_model_min_bin_idx, reshaper_model_max_bin_idx, RspCW[i], RspDeltaCW [i], ReshapePivot[i], ScaleCoef[i], InvScaleCoeff[i], ChromaScaleCoef[i], tile_group_reshaper_enable_flag, or tile_group_reshaper_chroma_residual_scale_flag, for i ranging between a lower limit and an upper limit.

54. The method of clause 53, wherein the lower limit and the upper limit respectively are reshaper_model_min_bin_idx and reshaper_model_max_bin_idx.

55. The method of clause 53, wherein the lower limit and the upper limit respectively are zero and MaxBinIdx.

56. The method of clause 45, wherein the reference picture is selected in response to determining that a tile group header, a slice header, or a picture header of the reference picture is of I-type.

57. The method of clause 45, wherein the reference picture is selected from a group of reference pictures in response to determining that a tile group header, a slice header, or a picture header of the group of reference pictures is of I-type.

58. The method of clause 57, wherein the reference picture is closest to the current video block.

59. The method of clause 58, wherein an absolute difference of a picture order count (POC) of the reference picture and the current video block is smallest in the group of reference pictures.

60. The method of clause 45, wherein, in response to determining that a tile group header, a slice header, or a picture header of the reference picture lacks I-type, further comprising:
 selecting the reference picture with reference index 0 and reference list 0, upon determining that a reference picture is non-existent in reference list 1;
 selecting the reference picture with reference index 0 and reference list 0, upon determining that a I-type slice with picture order count (POC) larger than the current video block is non-existent;
 selecting the reference picture with reference index 0 and reference list 0, upon determining a condition |POC_I0−POC_curr|<=|POC_I1−POC_curr| is satisfied, wherein POC of most recent I slice having a POC larger than the current video block is denoted as POC_I1, POC of the most recent I slice having a POC smaller than the current video block is denoted as POC_I0, and POC of the current video block is POC_curr, wherein |x−y| denotes an an absolute difference of x and y;

otherwise, by default, selecting the reference picture with with reference index 0 and reference list 1, wherein reference list 0 and reference list 1 is included in the one or more reference lists.

61. The method of any one or more of clauses 1-60, wherein the visual media processing is an encoder-side implementation.

62. The method of any one or more of clauses 1-60, wherein the visual media processing is a decoder-side implementation.

63. An apparatus in a video system comprising a processor and a non-transitory memory with instructions thereon, wherein the instructions upon execution by the processor, cause the processor to implement the method in any one or more of clauses 1-60.

64. A computer program product stored on a non-transitory computer readable media, the computer program product including program code for carrying out the method in any one or more of clauses 1-60.

The second set of clauses describe certain features and aspects of the disclosed techniques listed in the previous section, including, for example, Example Implementations 1, 2, 4, 6-13.

1. A method of video coding, comprising: performing a conversion between a coded representation of a video comprising one or more video regions and the video, wherein the coded representation includes side information applicable for in-loop reshaping (ILR) of some of the one or more video regions, wherein the side information provides parameters for a reconstruction of a video unit of a video region based on a representation of the video unit in a first domain and a second domain and/or scaling chroma residue of a chroma video unit, and wherein the side information applicable to the some of the one or more video regions is coded without directly inheriting from other video regions.

2. The method of clause 1, wherein the side information includes one or more lookup tables or parameters for one or more piece-wise linear models related to chroma samples or luma samples.

3. The method of clause 1, wherein the video region is a picture, slice, tile group, or other video data unit.

4. The method of clause 1, wherein the side information is predictively coded in the coded representation.

5. The method of clause 1, wherein differences between the side information of the video unit and the side information of another video unit are predictively coded, wherein the differences are related to at least one parameter in parameters for a piece-wise linear model.

6. The method of clause 1, wherein only some of parameters of a piece-wise linear model is inherited and remaining parameters are signaled.

7. The method of clause 2, wherein the side information is coded by using one or multiple sets of side information corresponding to one or multiple piece-wise linear models.

8. The method of clause 2, wherein one or multiple indices of the multiple sets of piece-wise linear models are signaled in the coded representation of the video.

9. The method of clause 8, wherein the side information that has been signaled is used to derive the side information of the video unit.

10. The method of clause 8, wherein the one or multiple indices of the side information are included in a tile group header, slice header, or picture header.

11. The method of clause 1, wherein one or multiple sets of the side information are signaled in an adaptation parameter set (APS).

12. The method of clause 1, wherein one or multiple sets of the side information are stored in a buffer.

13. The method of clause 1, wherein parameters coded in the coded representation are utilized to update the buffer.

14. The method of clause 1, wherein the side information for the video region is inherited from one of multiple sets of the side information stored in the buffer.

15. The method of clause 14, wherein an index of the one of multiple sets of side information is signaled.

16. The method of clause 1, wherein the side information for the video region is predicted from one or multiple sets of side information stored in the buffer.

17. The method of clause 16, wherein an index of the one or multiple sets of the side information is signaled.

18. A method for video processing, comprising: performing a conversion between a coded representation of a video comprising one or more video regions and the video, wherein the coded representation includes side information applicable for in-loop reshaping (ILR) of some of the one or more video regions, wherein the side information provides parameters for a reconstruction of a video unit of a video region based on a representation of the video unit in a first domain and a second domain and/or scaling chroma residue of a chroma video unit, and wherein the coded representation includes the side information at a video region level that includes a current video block.

19. The method of clause 18, wherein the video region level includes a tile level or a coding tree unit (CTU) level.

20. The method of clause 18, wherein, for a picture or a tile group including multiple tiles, an inheritance or prediction of the side information of the current video block between tiles is allowed.

21. The method of clause 18, wherein, for a picture or a tile group including multiple tiles, an inheritance or prediction of the side information of the current video block is disallowed.

22. The method of clause 18, wherein the video region level is a tile group header and all tiles within a corresponding tile group share the side information.

23. A video processing method, comprising: determining a prediction block of a current video block, for a conversion between the current video block of a video region of a video and a coded representation of the video, using samples from the video region, wherein unavailable samples of the samples from the video region are determined based on a derivation rule that specifies to use an in-loop reshaping (ILR) information associated with the current video block; and performing the conversion based on the prediction block, wherein the in-loop reshaping information includes information for a reconstruction of a video unit of the video region based on a representation of the video unit in a first domain and a second domain and/or scaling chroma residue of a chroma video unit.

24. The method of clause 23, wherein, for the current video block coded in intra coding or coded in a cross-component linear model (CCLM) mode, a default value is set for the in-loop reshaping information.

25. The method of clause 24, wherein the default value is set as forwardLUT(x), wherein forwardLUT(.) is a lookuptable and x is a value used when the coding mode is disabled.

26. The method of clause 25, wherein the value x is set as (1<<(Bitdepth−1)), wherein Bitdepth is an input bitdepth value of the current video block or a video block reconstructed from the current video block.

27. A video processing method, comprising: performing a conversion between a current video block of a video and a coded representation of the video using an in loop reshaping process, wherein the in loop reshaping process includes: obtaining a prediction block from motion compensation prediction or an intra prediction; applying a forward reshaping to the prediction block to generate a forward reshaped prediction block in a first domain; reconstructing, based on the forward reshaped prediction block, the coded representation of the video to generate a first reconstruction block in a second domain; applying an inverse reshaping to the first reconstruction block to obtain an inverse reconstruction block; applying a loop filter to the inverse reconstruction block to obtain a final reconstruction block, and wherein a single clipping process is used during the in loop reshaping process.

28. The method of clause 27, wherein the single clipping process is used with clipping parameters defined in the first domain and derived from a look up table or a piece-wise linear (PWL) model used in the in loop reshaping process.

29. The method of clause 28, wherein a minimum value of the clipping parameters is defined as inverseLUT(x), wherein inverseLUT(.) is an inverse lookup table and x is 0.

30. The method of clause 28, wherein the clipping parameters is defined as inverseLUT(y), wherein inverseLUT(.) is an inverse lookup table and y is unequal to 0.

31. The method of clause 27, wherein the single clipping process is used with clipping parameters defined in the second domain and derived from a look up table or a piece-wise linear (PWL) model used in the in loop reshaping process.

32. The method of clause 31, wherein a minimum value of the clipping parameters is defined as a default value that is 0.

33. The method of clause 27, wherein a minimum value of the clipping parameters is defined as inverseLUT(y), wherein inverseLUT(.) is an inverse lookup table and y is the largest value obtained by solving InverseLUT(y) unequal to InverseLUT(y−1) or InverseLUT(y+1).

34. The method of clause 33, wherein y lies in a range [0, maximum entry index] or in a range [0, (1<<(Bitdepth−1))], wherein Bitdepth is an input bitdepth value of the current video block or a video block reconstructed from the current video block.

35. A video processing method, comprising: performing a conversion between a coded representation of a video comprising one or more video regions and the video, wherein the coded representation includes in-loop reshaping (ILR) information applicable for a reconstruction of a video unit of a video region based on a representation of the video unit in a first domain and a second domain and/or scaling chroma residue of a chroma video unit, and wherein a clipping process is used for the conversion based on clipping parameters that are in the first domain and/or in the second domain according to the ILR information.

36. The method of clause 35, wherein the clipping parameters are used during a prediction block generation process, the prediction block generation process including at least one of intra and/or intra block copy generation or inter prediction block generation.

37. The method of clause 35, wherein the clipping parameters are used during the conversion performed in a palette mode in which at least a palette of representative sample values is used for the video unit.

38. The method of clause 35, wherein the clipping parameters are used during a motion compensation process.

39. The method of clause 35, wherein the clipping parameters are used during a final reconstruction block derivation process.

40. The method of clause 35, wherein the clipping parameters are used during a filtering process.

41. A video processing method, comprising: performing a conversion between a coded representation of a video comprising one or more video regions and the video, wherein the coded representation includes information applicable for in-loop reshaping (ILR) of some of the one or more video regions, wherein the information provides ILR parameters for a reconstruction of a video unit of a video region based on a representation of the video unit in a first domain and a second domain and/or scaling chroma residue of a chroma video unit, and wherein the ILR parameters include clipping parameters used according to a rule for a clipping process during the ILR.

42. The method of clause 41, wherein the rule defines different values for the clipping parameters at different stages of ILR.

43. The method of clause 42, wherein the clipping parameters are defined in the second domain and used for the conversion before an ILR filtering operation.

44. The method of clause 42, wherein the clipping parameters are defined in the second domain and used for a prediction block process and/or a reconstruction of the video unit.

45. The method of clause 42, wherein the clipping parameters are defined in the first domain and used during an in-loop filtering operation applied to the video unit.

46. The method of clause 43 or 45, wherein the in-loop filtering operation is performed using a deblocking filter, a sample adaptive offset filter, or an adaptive loop filter.

47. A video processing method, comprising: determining whether an in loop reshaping (ILR) is enabled for a conversion between a coded representation of a video comprising one or more video regions and the video; and performing the conversion based on the determining, wherein a clipping process is used for the conversion based on ILR clipping parameters derived according to information associated with the ILR and/or fixed clipping parameters unrelated to the information associated with the ILR, and wherein the information associated with the ILR is applicable for a reconstruction of a video unit of a video region based on a representation of the video unit in a first domain and a second domain and/or scaling chroma residue of a chroma video unit.

48. The method of clause 47, wherein the determining determines that the ILR is disabled, and wherein the fixed clipping parameters are used for the conversion.

49. The method of clause 47, wherein the determining determines that the ILR is enabled, and wherein the ILR clipping parameters represented in the first domain and/or the second domain are used for the conversion.

50. The method of clause 47, wherein the determining further determined whether an adaptive clipping process is enabled for the conversion, and the clipping process is used for the conversion based on at least one of ILR clipping parameters, fixed clipping parameters, or adaptive clipping parameters.

51. The method of clause 50, wherein the determining determines that the ILR is disabled and that the adaptive clipping process is enabled, and the adaptive clipping parameters are used for the conversion.

52. The method of clause 50, wherein the determining determines that the ILR is enabled and the ILR clipping parameters represented in the first domain and/or the second domain are used for the conversion.

53. The method of clause 50, wherein the determining determines that the ILR is disabled and that the adaptive clipping is disabled, and the fixed clipping parameters are used for the conversion.

54. The method of any one of clauses 1 to 53, further comprising detecting a certain condition associated with the video unit.

55. The method of clause 54, wherein the certain condition is whether the coding mode is enabled or disabled for a video region including the video unit.

56. The method of clause 54, wherein the condition is related to any one or more of: a luma color component, a main color component, a color format, or a chroma component.

57. A method for video processing, comprising: performing a conversion between a current video block of a video that is a chroma block and a coded representation of the video, wherein the coded representation includes side information applicable for in-loop reshaping (ILR) of some of the one or more video regions, wherein the side information provides parameters for a reconstruction of a video unit of a video region based on a representation of the video unit in a first domain and a second domain and/or scaling chroma residue of a chroma video unit, and wherein the conversion further includes applying a reshaping process to one or more chroma components of the current video block based on the side information.

58. The method of clause 57, wherein the side information associated with the coding mode includes look up tables and/or piece-wise linear (PWL) models.

59. The method of clause 57, wherein the method further includes: determining whether a color format of the current video block is 4:4:4; and refraining from applying a luma-based residual scaling to the one or more chroma components of the current video block based on the determining.

60. The method of clause 59, wherein the color format of the current video block is 4:4:4, and wherein the luma-based residual scaling is replaced by the look up tables and/or piece-wise linear models that are signaled or derived.

61. The method of clause 57, wherein two chroma components of the current video block share the side information associated with the coding mode.

62. The method of clause 57, wherein the method further includes: determining whether a color format of the current video block is 4:4:4; and deriving look up tables and/or piece-wise linear models for chroma components from those for the luma component.

63. The method of clause 57, wherein the method further includes: determining whether a color format of the current video block is 4:4:4, and wherein look up tables and/or piece-wise linear models for chroma components are signaled in an adaptation parameter set (APS), a picture parameter set (PPS), a picture header, a slice header, a tile group header, a tile, or other video units.

64. The method of clause 57, wherein the method further includes: determining whether a color format of the current video block is 4:4:4, and wherein look up tables and/or piece-wise linear models for chroma components are predictively coded in an adaptation parameter set (APS), a picture parameter set (PPS), a picture header, a slice header, a tile group header, a tile, or other video units.

65. The method of clause 64, wherein the look up tables and/or the piece-wise linear models of a color component are predicted from that of another color component.

66. The method of clause 58, wherein the method further includes: determining whether a color format of the current video block is 4:4:4, and wherein the look up tables and/or piece-wise linear models of a color component are derived from that of another color component.

67. The method of clause 66, wherein the look up tables and/or the piece-wise linear models of a chroma component are predicted from that of the luma component and/or another chroma component.

68. The method of clause 57, wherein the reshaping process is disabled and wherein reshaping for a chroma component of the current video block is directly disabled.

69. The method of clause 57, wherein the side information is not signaled.

70. The method of any of clauses 1 to 69, wherein the performing of the conversion includes generating the coded representation from the video.

71. The method of any of clauses 1 to 69, wherein the performing of the conversion includes generating the video from the coded representation.

72. An apparatus in a video system comprising a processor and a non-transitory memory with instructions thereon, wherein the instructions upon execution by the processor, cause the processor to implement the method in any one of clauses 1 to 71.

73. A computer program product stored on a non-transitory computer readable media, the computer program product including program code for carrying out the method in any one of clauses 1 to 71.

The third set of clauses describe certain features and aspects of the disclosed techniques listed in the previous section, including, for example, Example Implementation 3.

1. A video processing method, comprising: performing a conversion between a coded representation of a video comprising one or more video regions and the video, wherein the coded representation includes side information applicable for in-loop reshaping (ILR) of some of the one or more video regions, wherein the side information provides parameters for a reconstruction of a video unit of a video region based on a representation of the video unit in a first domain and a second domain and/or scaling chroma residue of a chroma video unit, and wherein the side information for a current video region is determined according to a rule that disallows inheritance or prediction of the side information based on a temporal layer index of the current video region.

2. The method of clause 1, wherein the inheritance or the prediction is disabled in a case that another picture is associated with a temporal layer index greater than the temporal layer index of the picture including the current video region.

3. The method of clause 1, wherein the inheritance or the prediction is only enabled in a case that another picture is stored in a decoded picture buffer.

4. The method of any of clauses 1 to 3, wherein one or more fields in reshaping information of another video region are copied to reshaping information of the current video region.

5. The method of clause 4, wherein the one or more fields include at least one of: i) reshaper_model_min_bin_idx, ii) reshaper_model_max_bin_idx, iii) RspCW[i], iv) RspDeltaCW [i], v) ReshapePivot[i], vi) ScaleCoef[i], vii) InvScaleCoeff[i], viii) ChromaScaleCoef[i], viiii) ix) tile_group_reshaper_enable_flag, or x) tile_group_reshaper_chroma_residual_scale_flag.

6. A video processing method, comprising: performing a conversion between a coded representation of a video comprising one or more video regions and the video, wherein the coded representation includes side information applicable for in-loop reshaping (ILR) of some of the one or more video regions, wherein the side information provides parameters for a reconstruction of a video unit of a video region based on a representation of the video unit in a first domain and a second domain and/or scaling chroma residue of a chroma video unit, and wherein the side information for a current video region is determined according to a rule that disallows inheritance or prediction of the side information from a first type of another picture.

7. The method of clause 6, wherein the side information includes one or more lookup tables or parameters for one or more piece-wise linear models related to chroma samples, luma samples, or information enabling/disabling ILR, or information enabling/disabling chroma residual scaling.

8. The method of clause 6, wherein the current video region is a current picture, slice, tile group, or other video data units.

9. The method of clause 6, wherein the first type comprises pictures which are not reference pictures for the current video region including a current picture, slice, tile group, tile, or other video data unit.

10. The method of clause 6, wherein the inheritance or the prediction is enabled when a temporal layer index of the reference picture is no larger than a temporal index layer for the current video region including a current picture, slice, tile group, tile, or other video data unit.

11. The method of clause 6, wherein the first type comprises all pictures.

12. The method of clause 6, wherein the first type excludes a picture having smaller or equal temporal layer index of the current video region including a current picture, lice, tile group, tile, or other video data unit.

13. The method of clause 6, wherein the first type includes a picture having larger temporal layer index of the current video region including a current picture, lice, tile group, tile, or other video data unit.

14. The method of clause 13, wherein the picture is a reference picture for the current video region including a current picture, slice, tile group, tile or other video data unit.

15. The method of clause 6, wherein one or more reference lists and/or reference indices associated with another picture are signaled.

16. The method of clause 15, wherein the one or more reference lists and/or reference indices are included in a tile group header, a slice header, or a picture header.

17. The method of clause 16, wherein a syntax element includes a first field to indicate whether the side information is inherited from another reference picture in a given reference picture list and/or a second field to indicate a reference index of another reference picture from which the side information is inherited.

18. The method of clause 16, wherein the side information is initialized in a case that a reshaper model associated with the coding mode is not present in the tile group header and that the current video region is I-tile group or I-slice.

19. The method of clause 6, wherein the side information is inherited from the side information of a tile group or a slice of the reference picture.

20. The method of clause 6, wherein the reference picture is predefined.

21. The method of clauses 20, wherein the reference picture is a collocated picture.

22. The method of clause 20, wherein the reference picture has a reference index IDX and a reference list LX, and wherein LX=0 and IDX=0.

23. The method of clause 20, wherein the reference picture is closest in a displaying order to the current video region.

24. The method of clause 20, wherein the reference picture is closest in a decoding order to the current video region.

25. The method of any of clauses 1 to 24, wherein the performing of the conversion includes generating the coded representation from the video.

26. The method of any of clauses 1 to 24, wherein the performing of the conversion includes generating the video from the coded representation.

27. An apparatus in a video system comprising a processor and a non-transitory memory with instructions thereon, wherein the instructions upon execution by the processor, cause the processor to implement the method in any one of clauses 1 to 24.

28. A computer program product stored on a non-transitory computer readable media, the computer program product including program code for carrying out the method in any one of clauses 1 to 24.

The fourth set of clauses describe certain features and aspects of the disclosed techniques listed in the previous section, including, for example, Example Implementation 5.

1. A video processing method, comprising: performing a conversion between a coded representation of a video comprising one or more video regions and the video, wherein the coded representation includes a first side information at a first level, wherein a second side information at a second level is derived from the first side information such that the second side information provides parameters for a video unit coded with in-loop reshaping (ILR) in which a reconstruction of the video unit of a video region is based on a representation of a video unit in a first domain and a second domain and/or scaling chroma residue of a chroma video unit.

2. The method of clause 1, wherein the second side information is based on one or more syntax elements present in the second level.

3. The method of clause 1, wherein the first level is a tile group level and the second level is a tile level.

4. The method of clause 1, wherein the first level is a picture level and the second level is a tile group level.

5. The method of clause 1, wherein the first level is a picture level and the second level is a tile group level.

6. The method of clause 1, wherein the first level is an adaptation parameter set (APS) level and a second level is a picture level, tile group level, or tile level.

7. The method of clause 1, wherein the first side information is present in the ILR adaptation parameter set (APS) and the second side information is present in picture header.

8. The method of any clause of 1 to 7, wherein the second side information is inherited from the first side information.

9. The method of any clause of 1 to 7, wherein the second side information is predicted from the first side information.

10. The method of any clause of 1 to 7, wherein at least one of the first side information or the second side information comprises at least one of: information to enable or disable the ILR, a parameter of piece-wise linear models, information to enable or disable a reshaping between the first and second domain, or information to enable or disable a chroma residual scaling.

11. The method of any of clauses 1 to 10, wherein the performing of the conversion includes generating the coded representation from the video.

12. The method of any of clauses 1 to 10, wherein the performing of the conversion includes generating the video from the coded representation.

13. An apparatus in a video system comprising a processor and a non-transitory memory with instructions thereon, wherein the instructions upon execution by the processor, cause the processor to implement the method in any one of clauses 1 to 12.

14. A computer program product stored on a non-transitory computer readable media, the computer program product including program code for carrying out the method in any one of clauses 1 to 12.

In the present document, the term "video processing" or "visual media processing" may refer to image or video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation. The side information may be, for example, an adaptation parameter set included with the coded representation or bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
performing a conversion between a bitstream of a video comprising one or more video regions and the video,
wherein the bitstream includes side information applicable for a coding tool of some of the one or more video regions,
wherein the side information provides parameters for a reconstruction of a video unit of a current video region based on at least one of:
1) a forward mapping process for a luma component of the video unit, in which prediction samples of the luma component are converted from an original domain to a reshaped domain,
2) an inverse mapping process, which is an inverse operation of the forward mapping process, that convert reconstructed samples of the luma component in the reshaped domain to the original domain, or
3) a scaling process, in which residual samples of a chroma component of the video unit are scaled before being used to reconstruct the chroma component, and
wherein the side information for the current video region is based on an adaptation parameter set having a smaller or equal temporal layer index than the current video region,
wherein a level of the adaptation parameter set is higher than a level of the current video region, and
wherein parameters of the adaptation parameter set are copied to the parameters in the side information of the current video region.

2. The method of claim 1, wherein the side information for the current video region is copied from the adaptation parameter set.

3. The method of claim 1, wherein inheritance or the prediction is disabled in a case that another video region is associated with a temporal layer index greater than the temporal layer index of the current video region.

4. The method of claim 1, wherein the parameters in the side information include at least one of: i) at least one first parameter indicating a minimum bin index used in the forward mapping process or the inverse mapping process, ii) at least one second parameter indicating a maximum bin index used in the forward mapping process or the inverse mapping process, iii) at least one third parameter indicating a delta codeword value for the forward mapping process or the inverse mapping process, iv) at least one fourth parameter related to at least one chroma residue scaling factor for the scaling process.

5. The method of claim 1, wherein a piecewise linear model is used in the forward mapping process to map the prediction samples of the luma component into particular values.

6. The method of claim 5, wherein scale coefficients of the piecewise linear model are determined based on first variables which are determined based on the parameters in the side information and a second variable which are determined based on a bit depth.

7. The method of claim 1, wherein the current video region is a current picture, slice, tile group, or other video data units.

8. The method of claim 1, wherein the conversion includes encoding the current video region into the bitstream.

9. The method of claim 1, wherein the conversion includes decoding the current video region from the bitstream.

10. An apparatus for processing video data comprising a processor and a non-transitory memory with instructions thereon, wherein the instructions upon execution by the processor, cause the processor to:
perform a conversion between a bitstream of a video comprising one or more video regions and the video,
wherein the bitstream includes side information applicable for a coding tool of some of the one or more video regions,
wherein the side information provides parameters for a reconstruction of a video unit of a current video region based on at least one of:
1) a forward mapping process for a luma component of the video unit, in which prediction samples of the luma component are converted from an original domain to a reshaped domain,
2) an inverse mapping process, which is an inverse operation of the forward mapping process, that convert reconstructed samples of the luma component in the reshaped domain to the original domain, or
3) a scaling process, in which residual samples of a chroma component of the video unit are scaled before being used to reconstruct the chroma component, and
wherein the side information for the current video region is based on an adaptation parameter set having a smaller or equal temporal layer index than the current video region,
wherein a level of the adaptation parameter set is higher than a level of the current video region, and
wherein parameters of the adaptation parameter set are copied to the parameters in the side information of the current video region.

11. The apparatus of claim 10, wherein the side information for the current video region is copied from the adaptation parameter set.

12. The apparatus of claim 10, wherein the parameters in the side information include at least one of: i) at least one first parameter indicating a minimum bin index used in the forward mapping process or the inverse mapping process, ii) at least one second parameter indicating a maximum bin index used in the forward mapping process or the inverse mapping process, iii) at least one third parameter indicating a delta codeword value for the forward mapping process or the inverse mapping process, iv) at least one fourth parameter related to at least one chroma residue scaling factor for the scaling process.

13. A non-transitory computer-readable storage medium storing instructions that cause a processor to:
perform a conversion between a bitstream of a video comprising one or more video regions and the video,
wherein the bitstream includes side information applicable for a coding tool of some of the one or more video regions,
wherein the side information provides parameters for a reconstruction of a video unit of a current video region based on at least one of:

1) a forward mapping process for a luma component of the video unit, in which prediction samples of the luma component are converted from an original domain to a reshaped domain,
2) an inverse mapping process, which is an inverse operation of the forward mapping process, that convert reconstructed samples of the luma component in the reshaped domain to the original domain, or
3) a scaling process, in which residual samples of a chroma component of the video unit are scaled before being used to reconstruct the chroma component, and wherein the side information for the current video region is based on an adaptation parameter set having a smaller or equal temporal layer index than the current video region, wherein a level of the adaptation parameter set is higher than a level of the current video region, and wherein parameters of the adaptation parameter set are copied to the parameters in the side information of the current video region.

14. The non-transitory computer-readable storage medium of claim 13, wherein the side information for the current video region is copied from the adaptation parameter set.

15. The non-transitory computer-readable storage medium of claim 13, wherein the parameters in the side information include at least one of: i) at least one first parameter indicating a minimum bin index used in the forward mapping process or the inverse mapping process, ii) at least one second parameter indicating a maximum bin index used in the forward mapping process or the inverse mapping process, iii) at least one third parameter indicating a delta codeword value for the forward mapping process or the inverse mapping process, iv) at least one fourth parameter related to at least one chroma residue scaling factor for the scaling process.

16. A non-transitory computer-readable recording medium storing a bitstream of a video which is generated by a method performed by a video processing apparatus, wherein the method comprises:

generating the bitstream of the video comprising one or more video regions, wherein the bitstream includes side information applicable for a coding tool of some of the one or more video regions, wherein the side information provides parameters for a reconstruction of a video unit of a current video region based on at least one of:
1) a forward mapping process for a luma component of the video unit, in which prediction samples of the luma component are converted from an original domain to a reshaped domain,
2) an inverse mapping process, which is an inverse operation of the forward mapping process, that convert reconstructed samples of the luma component in the reshaped domain to the original domain, or
3) a scaling process, in which residual samples of a chroma component of the video unit are scaled before being used to reconstruct the chroma component, and wherein the side information for the current video region is based on an adaptation parameter set having a smaller or equal temporal layer index than the current video region, wherein a level of the adaptation parameter set is higher than a level of the current video region, and wherein parameters of the adaptation parameter set are copied to the parameters in the side information of the current video region.

17. The apparatus of claim 10, wherein a piecewise linear model is used in the forward mapping process to map the prediction samples of the luma component into particular values.

18. The apparatus of claim 17, wherein scale coefficients of the piecewise linear model are determined based on first variables which are determined based on the parameters in the side information and a second variable which are determined based on a bit depth.

19. The apparatus of claim 10, wherein the current video region is a current picture, slice, tile group, or other video data units.

20. The non-transitory computer-readable recording medium of claim 16, wherein the side information for the current video region is copied from the adaptation parameter set.

* * * * *